(12) United States Patent
Layman, Jr. et al.

(10) Patent No.: US 9,914,830 B2
(45) Date of Patent: Mar. 13, 2018

(54) LOW MOLECULAR WEIGHT BROMINATED POLYMERS, PROCESSES FOR THEIR MANUFACTURE AND THEIR USE IN THERMOPLASTIC FORMULATIONS

(71) Applicant: Albemarle Corporation, Baton Rouge, LA (US)

(72) Inventors: William J. Layman, Jr., Baton Rouge, LA (US); Arthur G. Mack, Conroe, TX (US); Charles H. Kolich, Baton Rouge, LA (US); Govindarajulu Kumar, Baton Rouge, LA (US)

(73) Assignee: ALBEMARLE CORPORATION, Baton Rouge, LA (US)

( * ) Notice: Subject to any disclaimer, the term of this patent is extended or adjusted under 35 U.S.C. 154(b) by 0 days.

(21) Appl. No.: 14/633,591

(22) Filed: Feb. 27, 2015

(65) Prior Publication Data
US 2015/0175797 A1 Jun. 25, 2015

Related U.S. Application Data

(62) Division of application No. 12/996,087, filed as application No. PCT/US2008/067935 on Jun. 23, 2008, now Pat. No. 8,993,684.

(51) Int. Cl.
| | |
|---|---|
| C08L 55/02 | (2006.01) |
| C08L 25/06 | (2006.01) |
| C08F 112/08 | (2006.01) |
| C08F 8/20 | (2006.01) |
| C08F 8/22 | (2006.01) |

(52) U.S. Cl.
CPC ............... *C08L 55/02* (2013.01); *C08F 8/20* (2013.01); *C08F 8/22* (2013.01); *C08F 112/08* (2013.01); *C08L 25/06* (2013.01); *C08L 2201/02* (2013.01); *C08L 2205/025* (2013.01)

(58) Field of Classification Search
CPC ......... C08L 55/02; C08L 25/06; C08F 112/08
USPC ..................................... 525/233, 241, 333.4
See application file for complete search history.

(56) References Cited

U.S. PATENT DOCUMENTS

| | | | |
|---|---|---|---|
| 2,243,543 A | 5/1941 | ter Horst | |
| 2,757,146 A | 7/1956 | Fawcett | |
| 2,914,489 A | 11/1959 | Hall | |
| 2,954,412 A | 9/1960 | Wulf et al. | |
| 3,221,068 A | 11/1965 | Gorham | |
| 3,372,880 A | 3/1968 | O'Hara | |
| 3,373,135 A | 3/1968 | Jenkner et al. | |
| 3,451,988 A | 6/1969 | Langer, Jr. | |
| 3,458,586 A | 7/1969 | Langer, Jr. | |
| 3,536,679 A | 10/1970 | Langer, Jr. | |
| 3,541,149 A | 11/1970 | Langer, Jr. | |
| 3,594,396 A | 7/1971 | Langer, Jr. | |
| 3,634,548 A | 1/1972 | Harwell et al. |
| 3,668,263 A | 6/1972 | Morrison et al. |
| 3,725,368 A | 4/1973 | Morrison et al. |
| 3,742,077 A | 6/1973 | Kamienski et al. |
| 3,751,384 A | 8/1973 | Langer, Jr. |
| 3,751,501 A | 8/1973 | Kamienski et al. |
| 3,850,882 A | 11/1974 | Underwood et al. |
| 3,943,195 A | 3/1976 | Naarmann et al. |
| 4,041,088 A | 8/1977 | Bach et al. |
| 4,074,032 A | 2/1978 | Naarmann et al. |
| 4,078,019 A | 3/1978 | Langer, Jr. |
| 4,107,231 A | 8/1978 | Wurmb et al. |
| 4,108,921 A | 8/1978 | Langer, Jr. |
| 4,129,551 A | 12/1978 | Rueter et al. |
| 4,129,705 A | 12/1978 | de Zarauz |
| 4,134,938 A | 1/1979 | Langer, Jr. |
| 4,137,212 A | 1/1979 | Theysohn et al. |
| 4,143,221 A | 3/1979 | Naarmann et al. |
| 4,151,223 A | 4/1979 | Neuberg et al. |
| 4,200,702 A | 4/1980 | Gausepohl et al. |
| 4,268,705 A | 5/1981 | Palmer |
| 4,311,818 A | 1/1982 | Sigwalt et al. |
| 4,360,455 A | 11/1982 | Lindenschmidt et al. |
| 4,394,484 A | 7/1983 | Jenkner et al. |
| 4,435,312 A | 3/1984 | Lecolier et al. |
| 4,450,259 A | 5/1984 | Roggero et al. |
| 4,463,135 A | 7/1984 | Maly |

(Continued)

FOREIGN PATENT DOCUMENTS

| | | |
|---|---|---|
| CN | 100369941 C | 2/2008 |
| DE | 1570376 | 7/1969 |

(Continued)

OTHER PUBLICATIONS

Technical Data sheet for Saytex® HP-3010 polymers.*
Technical Data sheet for Great Lakes PDBS-80™.*
Technical Data Sheet for Zytel® 70G43L.*
Technical Data Sheet for Zytel 101 Polymer.*
Couchman, P.R., "Compositional Variation of Glass-Transition Temperatures. 2. Application of the Thermodynamic Theory to Compatible Polymer Blends", Macromolecules, vol. 11, No. 6, Nov.-Dec. 1978, pp. 1156-1161.
Fox, T.G., et al., "Influence of Molecular Weight and Degree of Crosslinking on the Specific Volume and Glass Temperature of Polymers", Journal of Polymer Science, vol. XV, 1955, pp. 371-390.
Mikos, A. G., et al., "Brittle Fracture of Low Molecular Weight Polymers", Journal of Materials Science, vol. 24, 1989, pp. 1612-1616.

(Continued)

*Primary Examiner* — Deve E Valdez

(74) *Attorney, Agent, or Firm* — Jeremy J. Kliebert

(57) ABSTRACT

This invention relates flame retardant compositions containing low molecular weight brominated anionic, chain transfer, vinyl aromatic polymers, hereinafter "ACTVAP". The compositions can accommodate high bromine content while still exhibiting a low thermally labile bromine content. The compositions have glass transition temperatures, $T_g$, that are predictive of acceptable melt flows and heat distortion temperatures (HDT) in HIPS and ABS based formulations substrates. The compositions, are suitable flame retardant candidates for use in thermoplastic formulations, e.g. polystyrene and ABS formulations.

17 Claims, No Drawings

(56) References Cited

U.S. PATENT DOCUMENTS

| | | |
|---|---|---|
| 4,482,677 A | 11/1984 | Teranaka et al. |
| 4,535,135 A | 8/1985 | Lecolier et al. |
| 4,578,416 A | 3/1986 | Trivedi |
| 4,636,540 A | 1/1987 | Warfel |
| 4,701,498 A | 10/1987 | Roggero et al. |
| 4,734,461 A | 3/1988 | Roggero et al. |
| 4,753,745 A | 6/1988 | Kostusyk et al. |
| 4,755,573 A | 7/1988 | Aycock |
| 4,829,135 A | 5/1989 | Gunesin et al. |
| 4,853,440 A | 8/1989 | Roggero et al. |
| 4,883,846 A | 11/1989 | Moore et al. |
| 4,950,721 A | 8/1990 | Dias et al. |
| 4,953,721 A | 8/1990 | Dias et al. |
| 4,975,496 A | 12/1990 | Tigner et al. |
| 5,112,896 A | 5/1992 | Dever et al. |
| 5,112,897 A | 5/1992 | Dever et al. |
| 5,112,898 A | 5/1992 | Dever et al. |
| 5,196,622 A | 3/1993 | Pettijohn et al. |
| 5,198,594 A | 3/1993 | Lillwitz et al. |
| 5,302,768 A | 4/1994 | Hussain |
| 5,304,618 A | 4/1994 | Atwell et al. |
| 5,310,858 A | 5/1994 | Greiner et al. |
| 5,326,836 A | 7/1994 | Hwang et al. |
| 5,457,248 A | 10/1995 | Mack et al. |
| 5,625,017 A | 4/1997 | Morita et al. |
| 5,637,650 A | 6/1997 | Gill et al. |
| 5,654,384 A | 8/1997 | Halasa et al. |
| 5,677,390 A | 10/1997 | Dadgar et al. |
| 5,686,538 A | 11/1997 | Balhoff et al. |
| 5,687,090 A | 11/1997 | Chen et al. |
| 5,728,782 A | 3/1998 | Brady et al. |
| 5,741,949 A | 4/1998 | Mack |
| 5,767,203 A | 6/1998 | Ao et al. |
| 5,852,131 A | 12/1998 | Balhoff et al. |
| 5,852,132 A | 12/1998 | Dadgar et al. |
| 5,902,865 A | 5/1999 | Gausepohl et al. |
| 5,916,978 A | 6/1999 | Ao et al. |
| 6,008,283 A | 12/1999 | Rose et al. |
| 6,025,450 A | 2/2000 | Lawson et al. |
| 6,093,211 A | 7/2000 | Hamielec et al. |
| 6,133,381 A | 10/2000 | Reed et al. |
| 6,207,765 B1 | 3/2001 | Ao et al. |
| 6,232,393 B1 | 5/2001 | Dadgar et al. |
| 6,232,408 B1 | 5/2001 | Dadgar et al. |
| 6,235,831 B1 | 5/2001 | Reed et al. |
| 6,235,844 B1 | 5/2001 | Dadgar et al. |
| 6,313,230 B1 | 11/2001 | Tsai et al. |
| 6,326,439 B1 | 12/2001 | Dadgar et al. |
| 6,348,166 B1 | 2/2002 | Knoll et al. |
| 6,355,194 B1 | 3/2002 | Agur et al. |
| 6,362,293 B1 | 3/2002 | Newman et al. |
| 6,521,714 B2 | 2/2003 | Kolich et al. |
| 6,657,028 B1 | 12/2003 | Aplin et al. |
| 6,759,498 B2 | 7/2004 | Ikematsu et al. |
| 6,767,960 B2 | 7/2004 | Bae et al. |
| 6,933,343 B2 | 8/2005 | Ikematsu et al. |
| 7,288,612 B2 | 10/2007 | Desbois et al. |
| 7,351,777 B2 | 4/2008 | Moore et al. |
| 7,425,290 B2 | 9/2008 | Semen |
| 7,632,893 B2 | 12/2009 | Kolich et al. |
| 7,638,583 B2 | 12/2009 | Kolich et al. |
| 8,071,688 B2 | 12/2011 | Kolich et al. |
| 8,476,373 B2 | 7/2013 | Layman, Jr. et al. |
| 8,796,388 B2 | 8/2014 | Layman, Jr. et al. |
| 2002/0035214 A1 | 3/2002 | Gill et al. |
| 2002/0183465 A1 | 12/2002 | Babcock et al. |
| 2005/0143526 A1 | 6/2005 | Faust et al. |
| 2005/0209408 A1 | 9/2005 | Lee et al. |
| 2006/0079644 A1 | 4/2006 | Meyer et al. |
| 2007/0004870 A1* | 1/2007 | Kolich .............. C08F 8/20 525/333.3 |
| 2007/0142566 A1 | 6/2007 | Kolich et al. |
| 2007/0185280 A1 | 8/2007 | Luther |
| 2007/0232759 A1 | 10/2007 | Chun et al. |
| 2010/0184941 A1 | 7/2010 | Layman, Jr. et al. |
| 2011/0224353 A1 | 9/2011 | Layman, Jr. et al. |
| 2011/0224363 A1 | 9/2011 | Layman, Jr. et al. |

FOREIGN PATENT DOCUMENTS

| | | |
|---|---|---|
| DE | 1589700 | 7/1970 |
| DE | 2050009 | 5/1971 |
| DE | 2758781 | 7/1979 |
| DE | 19516563 A1 | 11/1996 |
| EP | 0000141 A1 | 1/1979 |
| EP | 0002514 B2 | 6/1979 |
| EP | 0277429 B1 | 8/1988 |
| EP | 0334715 B1 | 9/1989 |
| EP | 0741147 A1 | 11/1996 |
| EP | 0775719 A2 | 5/1997 |
| EP | 0806437 A1 | 11/1997 |
| GB | 1107898 | 3/1968 |
| GB | 1174845 | 12/1969 |
| GB | 1270318 | 4/1972 |
| GB | 1342101 | 12/1973 |
| GB | 1536762 | 12/1978 |
| GB | 1589700 | 5/1981 |
| GB | 2164051 | 3/1986 |
| JP | 59-155454 | 9/1984 |
| JP | 62-042938 A | 2/1987 |
| JP | 08-188622 | 7/1996 |
| JP | 09-227625 | 9/1997 |
| JP | 09-249705 | 9/1997 |
| JP | 09-249706 | 9/1997 |
| JP | 10-182730 | 7/1998 |
| JP | 11-43511 | 2/1999 |
| JP | 11-080220 | 3/1999 |
| JP | 11-116613 | 4/1999 |
| JP | 2001-341246 | 12/2001 |
| WO | 1990/15095 A1 | 12/1990 |
| WO | 1999/25746 A1 | 5/1999 |
| WO | 1999/55770 A1 | 11/1999 |
| WO | 2000/15678 A1 | 3/2000 |
| WO | 2002/072645 A2 | 9/2002 |
| WO | 2003/020826 A1 | 3/2003 |
| WO | 2005/063869 A1 | 7/2005 |
| WO | 2005/118245 A1 | 12/2005 |
| WO | 2007/005233 A1 | 1/2007 |
| WO | 2007/076369 A1 | 7/2007 |
| WO | 2008/011477 A2 | 1/2008 |
| WO | 2008/066970 A1 | 6/2008 |
| WO | 2008/154453 A1 | 12/2008 |
| WO | 2008/154454 A2 | 12/2008 |
| WO | 2009/148464 A1 | 12/2009 |
| WO | 2010/065462 A2 | 6/2010 |
| WO | 2010/065464 A1 | 6/2010 |
| WO | 2010/065467 A1 | 6/2010 |
| WO | 2010/065468 A1 | 6/2010 |
| WO | 2010/127072 A1 | 11/2010 |
| WO | 2010/127087 A1 | 11/2010 |
| WO | 2010/127091 A1 | 11/2010 |

OTHER PUBLICATIONS

Boyer, R.F., "Polymer Chain Stiffness Parameter, sigma, and Cross-Sectional Area per Chain", Macromolecules, vol. 10, No. 5, Sep.-Oct. 1977, pp. 1167-1169.

Privalko, V.P., et al., "Glass Transition and Chain Flexibility of Linear Polymers", J. Macromol. Sci.-Phys., B9(3), 1974, pp. 551-564.

Slep, D., et al., "Phase Separation of Polystyrene and Bromo-Polystyrene Mixtures in Equilibrium Structures in Thin Films", Langmuir, vol. 14, No. 17, 1998, pp. 4860-4864. Abstract Only—1 page.

Thaweephan, P., et al., "Effect of Aromatic Substitution on Phase Behavior of Blends of Halogenated Polystyrene and Conventional Polystyrene", Journal of Polymer Science, Part B: Polymer Physics, vol. 39, 2001, pp. 1605-1615.

Zielinski, J.M., "Predicting Polymer/Solvent Diffusion Coefficients Using Free-Volume Theory", AIChE Journal, vol. 38, No. 3, Mar. 1992, pp. 405-415.

(56) References Cited

OTHER PUBLICATIONS

Eberhardt, G. G., et al., "Telomerization Reactions Involving a N-Chelated Organo Lithium Catalyst", Polymer Preprints (American Chemical Society, Division of Polymer Chemistry), 1972, 13(2), pp. 667-671.

Feil, F., et al., "Benzyl Complexes of the Heavier Alkaline-Earth Metals: The First Crystal Structure of a Dibenzylstrontium Complex", Organometallics, 2001, vol. 20, pp. 4616-4622.

CAPLUS Abstract, Fujimoto, T., et al., "Preparation of Monodisperse Polystyrenes with High Molecular Weights", Polymer Journal, 1975, vol. 7 (3), pp. 397-401. 1 page.

Gatzke, A. L., "Chain Transfer in Anionic Polymerization. Determination of Chain-Transfer Constants by Using Carbon-14-Labeled Chain Transfer Agents", Journal of Polymer Science, Part A-1, vol. 7, 1969, pp. 2281-2292.

Science Direct Abstract of Helary, G., et al., "Etude de la polymerisation anionique du styrene en milieu non polaire, en presence de N,N,N',N' tetramethyl ethylene diamine", European Polymer Journal, vol. 14(5), 1978, pp. 345-348. 1 page.

Hennon, G.F., et al., "The Polybromination of Alkylbenzenes", J. Am. Chem. Soc., vol. 68(3), 1946, pp. 424-426.

CAPLUS Abstract, Ito, M., et al., "Synthesis of Well-Defined Block Copolymers Containing Poly(N-isopropylacrylamide) Segment by Anionic Block Copolymerization of N-methoxymethyl-N-isopropylacrylamide", Designed Monomers and Polymers, vol. 7(1-2), 2004, pp. 11-24. 1 page.

Junkui, C., "Synthesis of Narrow Distribution Polystyrene in RLi-Ligand Complex Systems", Chemical Journal of Chinese Universites, vol. 10(12), 1989, pp. 1246-1250.

CAPLUS Abstract, Kalnins, K, et al., "Electronic Structure of Complexes of Benzyl Anion and Ion Pairs With Styrene", Vysokomolekulyarnye Soedineniya, Seriya A, vol. 32(2), 1990, pp. 316-321. 1 page.

Lamneck, Jr., J.H., "Bromination of the Two Propylbenzenes and Three Butylbenzenes", J. Am. Chem. Soc, vol. 76(4), 1954, pp. 1106-1107.

CAPLUS Abstract, Langer, A. W., Jr., "Reactions of Chelated Organolithium Compounds", Transactions of the New York Academy of Science, vol. 27(7), 1965, pp. 741-747. 1 page.

Marechal, Jean-Marc, et al., "Stereoregulation in the anionic polymerization of styrene initiated by superbases", Polymer, vol. 44, 2003, pp. 7601-7607.

Marechal, Jean-Marc, et al., "Stereospecific anionic polymerization of styrene initiated by R2Mg/ROMt 'ate' complexes", Polymer, vol. 45, 2004, pp. 4641-4646.

Maruoka, K., et al., "Novel Anionic Oligomerization by a New, Sequential Generation of Organolithium Compounds", Marcomolecules, vol. 29, 1996, pp. 3328-3329.

Milner, R., et al., "Anionic telomerization of butadiene with toluene and diphenylmethane: microstructure and molecular weight", Polymer, vol. 26, 1985, pp. 1265-1267.

Mizuno, T., et al., "Second and Third Virial Coefficients of Polystyrene wtih Benzyl Ends near the Θ Point", Macromolecules, vol. 38, 2005, pp. 4432-4437.

CAPLUS Abstract, Morton, Maurice, et al., "Homogeneous anionic polymerization. II. Molecular weight of polystyrene initiated by lithium alkyls", Journal of Polymer Science, Part A-1, 1963, pp. 461-474. 1 page.

CAPLUS Abstract, Narita, T., et al., "Reactivity of buthylithium-MeOCH2CH2OLi system as catalyst for copolymerization of styrene with 1,3-butadiene", Journal of Macromolecular Science, Chemistry, vol. 4(2), 1970, pp. 277-294. 1 page.

Patterman, S.P., et al., "Π Complexation in Ion Pair Bonding. The Structure of Benzullithium Triethylenediamine", Journal of the American Chemical Society, vol. 92, 1970, pp. 1150-1157.

Litt, M., et al., "Molecular Weight Distribution in Anionic Polymerization Involving a Chain Transfer to Monomer", Journal of Polymer Science vol. XLII, pp. 159-164 (1960).

March, J., Advanced Organic Chemistry; Reactions, Mechanisms, and Structure; 4th ed., 1992: John Wiley & Sons, Chapter 15, pp. 743-744.

Atkins, P.W., Physical Chemistry, 4th edition, 1990, p. 800.

Baskaran, D., et al., "Effect of Chelation of the Lithium Cation on the Anionic Polymerization of Methyl Methacrylate Using Organolithium Initiators", Macromolecules, 1995, vol. 28, pp. 7315-7317.

Bildmann, U.J., et al., "Synthesis and Structure of the Tmeda Adduct of a Dibenzyl Lithiate Anion Containing Four-Coordinate Lithium", Organometallics, 2001, vol. 20, pp. 1689-1691.

CAPLUS Abstract, Chakrapani, S., et al., "Strategies for the Controlled, Living Anionic Polymerization of Acrylic and Methacrylic Monomers and Novel Star Polymers", Polymer Science, 1994, vol. 1, pp. 112-117. 1 page.

Salamone, Joseph C., ed., Concise Polymeric Materials Encyclopedia, CRC Press, 1999, pp. 1305-1307.

Eberhardt, G.G., et al., "A Catalytic Telomerization Reaction of Ethylene with Aromatic Hydrocarbons", J. Org. Chem., 1964, vol. 29 (10), pp. 2928-2932.

Pines, H., et al., "Sodium-catalyzed Side Chain Aralkylation of Alkylbenzenes with Styrene", J. Am. Chem. Soc., vol. 80(22), 1958, pp. 6001-6004.

Pines, H., et al., "Sodium Catalyzed Reactions. II. Side-chain Ethylation of Alkyl Aromatic Hydrocarbons Catalyzed by Sodium", J. Am. Chem. Soc., vol. 77(3), 1955, pp. 554-559.

Reed, J. N., "Product Subclass 13: Benzyllithium Compounds and (Lithiomethyl)hetarenes", Science of Synthesis, vol. 8a, 2005, pp. 329-355.

Seki, Atsushi, et al., "Crossed aldol reaction using cross-linked polymer-bound lithium dialkylamide", Tetrahedron, vol. 60, 2004, pp. 5001-5011.

Sorenson, W. R., et al., "Preparative Methods of Polymer Chemistry", Interscience Publishers, Inc., 1961, pp. 198-200.

Strohmann, C., et al., "A Highly Diastereomerically Enriched Benzyllithium Compound: The Molecular Structure and the Stereochemical Course of its Transformations", Organometallics, vol. 21, 2002, pp. 3079-3081.

Tsukahara, Y., et al., "Preparation and Characterization of α-Benzyl-ω-vinylbenzyl Polystyrene Macromonomer", Polymer Journal, vol. 26 (9), 1994, pp. 1013-1018.

CAPLUS Abstract, Waack, R., et al., "Effects of lithium halides on the reactivity of organolithium compounds [in polymerization]", Chemistry & Industry, vol. 12, 1964, pp. 496-497. 1 page.

Waack, R., et al., "Reactivities of organolithium compounds in tetrahydrofuran. I. As vinyl polymerization initiators", J. Org. Chem., 1967, vol. 32(11), pp. 3395-3399.

Wilhelm, D., et al., "Reactions of Polyanions Derived from Alkylbenzenes", J. Am. Chem. Soc., vol. 106, 1984, pp. 361-367.

DIC Corporation, Epoxy Resins, Brominated Flame Retardant Pratherm, from website http://www.dic.co.jp/en/products/epoxy/pratherm.html, 1 page.

ICL Industrial Products, F-3014-End Capped Brominated Epoxy, from website http://www.icl-ip.com/Brome/Brome.nsf/viewGetMain/Product350-40/$file/F-3014.pdf, 1 page.

\* cited by examiner

LOW MOLECULAR WEIGHT BROMINATED POLYMERS, PROCESSES FOR THEIR MANUFACTURE AND THEIR USE IN THERMOPLASTIC FORMULATIONS

REFERENCE TO RELATED APPLICATIONS

This application is a divisional of U.S. application Ser. No. 12/996,087, filed Dec. 3, 2010, which in turn is the National Stage of International Patent Appl. No. PCT/US2008/067935 filed on Jun. 23, 2008, which in turn claims the benefit of International Patent Appl. No. PCT/US2008/066218, filed on Jun. 6, 2008, the disclosure of which is incorporated herein by reference.

TECHNICAL FIELD

This invention relates to flame retardant compositions containing brominated anionic, chain transfer, vinyl aromatic polymers, hereinafter brominated "ACTVAP," and methods for their manufacture. The compositions can accommodate high bromine content while still exhibiting a low thermally labile bromine content. The compositions have glass transition temperatures ($T_g$) that are predictive of acceptable melt flows in high impact polystyrene (HIPS) and acrylonitrile-butadiene-styrene (ABS) based formulations. Articles produced from such formulations have good heat distortion temperatures. The compositions, are suitable flame retardant candidates for use in thermoplastic formulations, e.g. HIPS and ABS formulations.

BACKGROUND

Brominated polystyrenic (styrenic polymer) compositions have long been used as flame retardants in thermoplastic formulations. Brominated polystyrenes can be produced by bromination of polystyrenes, the polystyrenes being derived by free-radical or anionic polymerization of styrenic monomer, see for example, commonly-owned U.S. Pat. Nos. 5,677,390, 5,686,538, 5,767,203, 5,852,131, 5,852,132, 5,916,978, 6,133,381, 6,207,765, 6,232,393, 6,232,408, 6,235,831, 6,235,844, 6,326,439, and 6,521,714.

While many of the forgoing compositions and processes have and are meeting considerable commercial success, the skilled artisan is always searching for the next generation product or process that shows commercial advance and promise.

SUMMARY OF THE INVENTION

This invention relates to flame retardant compositions and processes for their production, the compositions comprising a brominated anionic, chain transfer, vinyl aromatic polymer (ACTVAP), wherein the compositions: (i) contain at least about 72 wt % bromine; and (ii) contain less than about 1,000 ppm (weight/weight) thermally labile Br, the wt % and ppm values being based upon the total weight of the composition. Within the invention scope are compositions in which the brominated ACTVAP is brominated anionic, chain transfer styrene polymer (ACTSP).

Further, this invention relates to flame retardant compositions and processes for their production, the compositions comprising a brominated anionic, chain transfer, vinyl aromatic polymer (ACTVAP), wherein the compositions: (i) has a glass transition temperature ($T_g$) within the range of from about 35° C. to about 165° C.; (ii) contain at least about 65 wt % bromine; and (iii) contain less than about 1,000 ppm (weight/weight) thermally labile Br, the wt % and ppm values being based upon the total weight of the composition. Within the invention scope are compositions in which the brominated ACTVAP is brominated anionic, chain transfer styrene polymer (ACTSP).

ACTVAP and ACTSP, as used herein, are acronyms for, in the first case, vinyl aromatic polymer, and, in the second case, styrene polymer that have been anionically derived and that have had their respective chain length distributions determined by a chain transfer mechanism. These polymers are subsequently brominated to yield the flame retardant compositions of this invention. The chain transfer agent is preferably toluene.

The use of the chain transfer mechanism allows for the use of catalytic amounts of conventional alkyl lithium polymerization initiators. The alkyl lithium initiators are also widely used in conventional polymerization of styrene. However, there, the polymer growth is not determined by chain transfer, but rather, by quenching of the lithium end-group, thus requiring the use of stoichiometric amounts (rather than catalytic amounts) of lithium alkyls to obtain the desired polymeric chain lengths. Thus, polymers using a chain transfer mechanism to determine chain length enjoy a considerable cost advantage that inures to the cost advantage of the compositions of this invention.

The flame retardant compositions of this invention exhibit, amongst other things, a glass transition temperature, i.e. $T_g$ that predicts that the use of such compositions to flame retard HIPS and ABS formulations will not frustrate molding qualities and that molded articles produced from such formulations will have acceptable heat distortion temperatures (HDT).

The combination of a favorable $T_g$ combined with a high bromine content and a low thermally labile bromine content provides a particularly preferred flame retardant composition of this invention.

The higher bromine content means that the flame retardant compositions of this invention can deliver more bromine, and hence more flame retardancy, to a HIPS or ABS formulation than the same weight of a composition having a lower bromine content. That quality offers cost savings opportunities for the manufacturer of the final thermoplastic article.

Low thermally labile bromine contents are desired since formulation compounding and article manufacturing conditions tend to release thermally labile bromine as HBr, which gas can be destructive of compounding and molding equipment.

In regard to bromine in the HIPS or ABS formulation or articles formed therefrom, it is mentioned that the compositions of this invention are essentially free (less than 50 ppm), if not totally free, of occluded bromine. Occluded bromine is bromine captured in the flame retardant composition as $Br_2$. Significant quantities of such bromine are not desirable for obvious reasons.

The flame retardant compositions of this invention have a thermogravimetric analysis (TGA) profile that predicts that the compositions are thermally stable enough to not excessively degrade under compounding and molding conditions but will degrade sufficiently to release their bromine substituent at the much higher temperatures experienced at a "flame front." The term "flame front" relates to the proximity of a fire to the flame retarded HIPS or ABS article. The fire can be just adjacent the article or emanating from the article itself.

The flame retardant compositions of this invention have good color. They are water-white or at least near water-white when tested by the Hunter Solution Color Value Test, see the "Analytical Methods" section below. In addition, the compositions have excellent YI values when tested in accordance with ASTM D1925. Such YI values are associated with the composition having a white or near white color when color tested as a solid.

The brominated ACTVAP or ACTSP found in the compositions of this invention are derived by the bromination of the corresponding ACTVAP or ACTSP. The unbrominated ACTVAP or ACTSP, can also be referred to as precursor or base ACTVAP or ACTSP. The base ACTVAP or ACTSP can have up to about 25 relative GPC area % monoadduct, e.g. 1,3-diarylpropane. When the aryl groups are phenyl groups, 1,3-diphenylpropane is the monoadduct. However, where desired, the base ACTVAP or ACTSP can be altered, prior to bromination, to have a lower monoadduct content. Alteration is usually effected by distillation to reduce the monoadduct content from the base ACTVAP or ACTSP. Such alteration is believed to be desirable as it is theorized, though this invention is not limited to such theory, that the monoadduct tends to brominate quickly and, thus, consume available bromine at a faster rate than that consumed by the higher molecular weight polymer chains making up the base ACTVAP or ACTSP. Such faster bromine consumption is believed to distort the extent and homogeneity of the bromination of the remainder of the higher molecular polymer constituents. Bromination homogeneity concerns the degree of uniformity in the distribution of aryl bromine along the polymer chain. The non-end group aryl groups are usually kinetically slower to brominate and hence harder to highly brominate than the terminal or "end-group" aryl-groups due to steric hindrances resulting from the internal molecular structure.

Disproportionate distribution of the bromine between the brominated monoadduct and the rest of the polymer constituents in the brominated ACTVAP or ACTSP can result in a flame retardant composition with a lower glass transition temperature, $T_g$, than would otherwise occur. If depressed enough, the lower $T_g$ predicts enhanced molding performance (high melt flow index) for the host HIPS or ABS and a reduced heat distortion temperature (HDT) for articles produced from the flame-retarded HIPS or ABS.

In the following "Detailed Description of the Invention" further description is given for the compositions of this invention. The compositions, to which the description applies, in part or in whole, are within the scope of the inventions disclosed herein.

Thermoplastic articles containing any one or more of the compositions of this invention are within the scope of the invention.

This invention also relates to processes for producing a brominated flame retardant composition, the process comprising brominating ACTVAP or ACTSP by the reaction of ACTVAP or ACTSP with a brominating agent in the presence of catalytic amount of $AlBr_3$ and a solvent wherein the composition can be characterized as: (i) containing less than 1,000 ppm (weight/weight) thermally labile bromine; and, either one or more of, (ii) containing greater than 65 wt % or 72 wt % bromine; (iii) having a glass transition temperature ($T_g$) within the range of from about to 35° C. to about 165° C.; and (iv) having at least a 97 wt % brominated ACTVAP or ACTSP content produced from ACTVAP or ACTSP having a number average molecular weight by GPC between from about 300 to about 1900 Daltons, the wt % and ppm values being based upon the total weight of the composition Preferred processes of this invention can be additionally characterized by the ACTVAP or ACTSP being fed as a solute in proximity to and contemporaneously with joint or separate feed(s) of the brominating agent and the $AlBr_3$, such feeds being made to a reactor pre-charged with solvent, and such feeds, along with pre-charged solvent, at least partially forming a reaction mass comprising: (i) the reaction products obtained by the feed of ACTVAP or ACTSP and their respective impurities, brominating agent and $AlBr_3$; (ii) solvent; (iii) $AlBr_3$ and; (iv), optionally, unreacted brominating agent, and such feeds being made subsurface of the reaction mass level and the reaction mass having a temperature within the range of from about −20° C. to about 5° C.

After the bromination, the reaction mass is preferably quenched in water to deactivate the $AlBr_3$ catalyst, such quenching forming an aqueous phase and an organic phase to which is optionally added (a) a reducing agent to lower the content of any brominating agent present and/or (b) a surfactant as needed to break any emulsion that may form in the aqueous phase; and separating the organic phase from the aqueous phase.

A preferred feature of the processes of this invention is, subsequent to the quenching, washing of the separated organic phase or any other organic phase derived therefrom with a basic, aqueous $NaBH_4$ solution to reduce the content of amine derived color bodies and thermally labile bromide that may be present, such washing(s) occurring at a temperature within the range of from about 45° to about 65° C.

In the following "Detailed Description of the Invention" further description is given for processes of this invention. The process features to which the description applies, in part or in whole, are within the scope of the inventions disclosed herein.

DETAILED DESCRIPTION OF THE INVENTION

Compositions of this Invention

Compositions of this invention are predominant in brominated ACTVAP or ACTSP. Generally, the compositions will contain at least about 97 wt % brominated ACTVAP or ACTSP, with the remainder being by-product impurities. Such impurities are, for the most part, by-products of either the polymerization or bromination processes used to ultimately obtain the brominated ACTVAP or ACTSP. Most preferred flame retardant compositions of this invention contain from about 99 to about 99.95$^+$ wt % brominated ACTVAP or ACTSP based on the total weight of the composition.

Base ACTVAP can be represented by the formula:

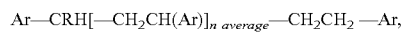

wherein Ar is an aryl group, R is a $C_1$-$C_4$ alkyl group or a hydrogen atom and $n_{average}$ is the average number of repeating units and is based on the number average molecular weight, $M_n$, of the ACTVAP distribution. $n_{average}$ is calculated:

$$n_{average} = (M_n - \text{formula wt ArCRH} - \text{formula wt ArCH}_2\text{CH}_2)/(\text{formula wt ArCH}_2\text{CH}_2)$$

Base ACTSP are those having the structure:

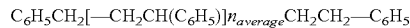

wherein the average $n_{average}$ value is determined by the formula:

$$n_{average} = (M_n - 196.29)/104.15.$$

The method of determining the $M_n$ for ACTVAP and ACTSP is described in the "Analytical Methods" section hereof.

The polymerization method for producing base ACTVAP or ACTSP can be generally described as the anionic polymerization of vinyl aromatic/styrene in the presence of toluene solvent (which also participates as the transfer agent) and a catalytic amount of butyllithium that is promoted with N,N,N',N'-tetramethylethylenediamine (TMEDA). See Examples ACTSP 1-12 herein.

For the reasons discussed previously, the monoadduct content of the base ACTVAP or ACTSP invention is preferred not to exceed about 25 GPC area % monoadduct, e.g. 1,3-diphenylpropane for ACTSP. (See GPC analysis in the "Analytical Methods section hereof.) Some base ACTVAP or ACTSP of this invention are designed to contain no more than about 10 GPC area % monoadduct, while others are designed to contain no more than about 5 GPC area % monoadduct. Almost monoadduct-free base ACTVAP or ACTSP will contain no more than about 1 GPC area % monoadduct. The compositions of this invention will reflect the amount of monoadduct present in the base ACTVAP or ACTSP with their own brominated monoadduct contents of like GPC area percents. For example, a composition produced from an ACTVAP or ACTSP containing less than about 25 GPC area % will in turn contain less than about 25 GPC area % brominated monadduct, based on the total weight of the composition.

Since the flame retardant compositions of this invention contain at least about 97 wt % brominated ACTVAP or ACTSP, and in preferred cases, 99 or more wt % brominated ACTVAP or ACTSP, the molecular weight measured for the compositions of this invention are considered to be the same as that for the brominated ACTVAP or ACTSP components. When the compositions and the brominated ACTVAP or ACTSP of this invention are subjected to polymeric analysis by GPC (See the "Analytical Methods section herein), an $M_w$ within the range of from about 1,000 to about 21,000 Daltons will be measured, preferred is the range of from about 1.250 to about 14,000 Daltons. The range for the $M_n$ value will be within the range of from about 860 to about 18,500 Daltons, preferred is the range of from about 1070 to about 8,200 Daltons. The polydispersity ($M_w/M_n$) is below 2.2 and is generally found to be within the range of from about 1.1 and about 1.7. Such polymeric molecular weights evidence a relatively low molecular weight brominated polymer and such may alternatively be referred to in the polymer arts as oligomers.

An important feature of flame retardant compositions of this invention is their compatibility with the host thermoplastic substrate, e.g. HIPS and ABS formulations. Compatibility is evidenced by the relatively small domain size of the compositions of this invention within the articles formed from the host thermoplastic formulation. Compatibility is a function of the degree of miscibility of the compositions in the host thermoplastic substrate. Domain sizes of from about 0.5 to about 2 microns are characteristic of compositions of this invention in formed HIPS or ABS articles. Miscibility is considered to be a function of polymer size and the composition's $T_g$. Generally, non-polymeric flame-retardants containing high levels of aryl bromine, e.g. >71 wt % bromine, and high molecular weight brominated polymers do not enjoy this compatibility.

Preferred flame retardant compositions of this invention have a $T_g$ within the range of from about 35° C. to about 165° C., and preferably within the range of from about 75° C. to about 135° C. Such $T_g$ values portend good moldibility when formulated in HIPS or ABS and good HDT values for products molded from such formulations. If the $T_g$ value is too high, the molding qualities of the formulation will exhibit too low of a melt flow, whereas if the $T_g$ is too low, HDT values for the final molded article can be unacceptably low. The glass transition temperature analysis is described in the "Analytical Methods" section herein.

The flame retardant compositions of this invention contain at least about 65 wt % bromine as determined by analysis of the flame retardant composition by X-Ray Fluorescence analysis (See the "Analytical Methods" section herein). Since the brominated ACTVAP or ACTSP components of the compositions of this invention are produced from very robust and well designed base ACTVAP or ACTSP it is possible to apply bromination process conditions that will push the bromine content of these polymers to very high levels without attendant excessive thermally labile bromine production, and excessive chain degradation. Flame retardant compositions of this invention contain from about 65 wt % to about 80 wt % bromine. It is believed that a particularly commercially attractive range will be from about 70 wt % to about 79 wt % bromine. Bromine contents of from greater than 72 wt % to about 78 wt % bromine are believed to be most favored from a commercial standpoint. The high bromine contents for the flame retardant compositions of this invention should enable lower flame retardant loadings on a weight basis without sacrifice of the flame retarding bromine content of the HIPS or ABS end-product. The forgoing wt % bromine values are based on the total weight of the flame retardant composition.

The flame retardant compositions of this invention, will average from about 2 to about 4.8 bromine substituents per aryl group in the polymer distribution. Preferably, they will average from about 3 to about 4.6 bromine substituents per aryl group in the polymer distribution. Thus, each aryl group in the polymer distribution may contain from about 2 to about 5 bromine substituents per aryl group (on an individual not average aryl group basis). The term "polymer distribution" means the total polymer constituents as measured by GPC analysis of the flame retardant composition and includes any brominated monoadducts present as a polymer constituent of the distribution. It does not include residual chain transfer agent or styrene monomer if present. As mentioned previously, since the compositions of this invention are very high in brominated ACTVAP or ACTSP, the number of bromine constituents in the compositions of this invention is essentially the same as for the brominated ACTVAP or ACTSP. The average number of bromine substituents is calculated by a combination of wt % bromine via XRF and GPC measurement for $M_n$. The calculation is illustrated as follows:

For 1 mole of material with the formula, $$C_6H_{(5-x)}Br_xCH_2(C_6H_{(5-x)}Br_xCHCH_2\text{---})CH_2CH_2\text{---}$$
$$C_6H_{(5-x)}Br_x$$

$$C_6H_{(5-x)}Br_xCH_2(C_6H_{(5-x)}Br_xCH_2$$
$$CH_2\text{---})_{n\ average}CH_2CH_2\text{---}C_6H_{(5-x)}Br_x$$

where x is the average number of bromine atoms per phenyl group.

then,

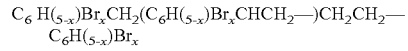

Total moles of Bromine ($Br_{moles}$) is given by:

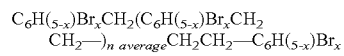

The average number of phenyl rings in one mole (Phenyl$_{average}$) is given by

Phenyl$_{average}$=2+$n_{average}$ where:

$n_{average}$=($M_{n\ (unbrominated)}$−196.29)/104.15 and:

$M_n$(unbrominated)=$M_{n(brominated)}$·(1-wt % Br/100), therefore x is given by $x$=Br$_{moles}$/Phenyl$_{average}$=$M_{n(brominated)}$·(wt % Br/80)/ 2+$n_{average}$ $x$=$M_{n(brominated)}$·(wt % Br/80)/(2+[($M_{n(unbrominated)}$− 196.29)/104.15])

$x$=$M_{n(brominated)}$·(wt % Br/80)/(2+[($M_{n(brominated)}$· (1- wt % Br/100)−196.29)/104.15])

The x values are given for each of the Brominated Examples in Table I.

The wt % bromine is affected by selection of the process parameters for the bromination of the base ACTVAP or ACTSP. Parameters, such as, bromination time, catalyst used, catalyst amount, reaction solvent, reaction temperature and the amount of bromine present, can influence the amount of bromination obtained. (See Bromination Examples 1-30)

Despite the relatively high bromine contents of the flame retardant compositions of this invention, it is a feature of such compositions that they exhibit relatively low thermally labile bromine contents.

The amount of thermally labile bromine in the compositions of this invention is low and falls within the range of from the detectable limits of the test to about 1000 ppm (weight/weight and based on the total weight of the composition) as measured at 300° C. for 15 minutes in accordance with the method described in the "Analytical Methods" section hereof. Thermally labile bromine contents may also fall within the narrower ranges of from the detectable limits of the test to about 750 ppm and from the detectable limits of the test to about 500 ppm. See Bromination Examples 1-30. The detectable limits of the test are evidenced by unacceptable loss of precision, usually occurring when attempting to measure thermally labile bromine in amounts less than 50 ppm. It is to be understood that flame retardant compositions of this invention can contain thermally labile bromine amounts lower than about 50 ppm when determined by tests that are capable of precision and accuracy at these low concentrations.

Besides having low thermally labile bromine contents, compositions of this invention must be otherwise thermally stable. They must be thermally stable so they do not degrade during the molding or compounding processes. They also must be stable under expected conditions of use, transport and storage. But the composition cannot be overly stable since to function as a flame retardant in the host HIPS or ABS substrate, the brominated ACTVAP or ACTSP constituent needs to thermally degrade only in the face of a fire threat. It is a feature of aryl bromine that, when in admixture with a flame retardant synergist, it does degrade and release its flame retarding bromine at a temperature, which is closely aligned with the temperatures that would be expected at a "flame front." Such release allows the bromine to interfere with the flame chemistry and thereby function as a flame retardant.

The flame retardant industry considers Thermal Gravimetric Analysis (TGA) to be an indicator of how a candidate flame retardant will perform in actual use. Compositions of this invention can have a TGA 5 wt % loss, under nitrogen, at a temperature within the range of from about 290° C. to about 380° C. It is expected that the flame retardant industry will prefer a TGA 5 wt % loss under nitrogen at a temperature within the range of from about 300° C. to about 370° C. Refer to the "Analytical Methods" section herein for a description of TGA analysis Compositions of this invention, as before said have good color. As measured by the Hunter Solution Color Value Test described in the "Analytical Methods" section hereof, the composition obtains Delta E values within the range of from about 0.4 to about 17. When the color is measured for the solid composition in accordance with ASTM D1925, YI values within the range of from about 1 to about 8 are obtained. Preferred YI values are within the range of from about 1 to about 6.

It is within the scope of this invention that the compositions of this invention can be used in admixture with other flame retardants, e.g. halogenated non-vinyl aromatic flame retardants, e.g. decabromodiphenylethane, decabromodiphenylether and tetrabromobisphenol-A, provided that such other flame retardants and their amounts do not frustrate the obtainment of the desired composition characteristics.

It is to be understood that since most of the compositions of this invention are comprised of at least 97 wt % brominated ACTVAP or ACTSP, when quantitative or qualitative values are recited for compositions of this invention, such values are considered to also apply to the brominated ACTVAP or ACTSP itself when applicable, e.g. $T_g$, bromine wt % content, thermally labile bromine wt % content, TGA, color, molecular weights, etc.

Thermoplastic Formulations of this Invention

The flame retardant compositions of this invention can be used in thermoplastic formulations based on HIPS or ABS. HIPS and ABS are well known to the art and are commercially available from several sources.

Preferably the compositions of this invention are used as additive flame retardants and are formulated with the HIPS or ABS based formulation in an amount sufficient to obtain the level of flame retardancy sought, generally a UL 94 rating of V-0 or V-2 for ⅛ inch (3.2 mm) test strips produced from the formulation. The formulation can comprise, and probably will comprise, other conventional additives. Conventional additives, such as flame retardant synergists, antioxidants, UV stabilizers, drip suppressants, pigments, impact modifiers, fillers, acid scavengers, blowing agents, and the like, can be included selected and used in suitable amounts in the formulations as is appropriate to achieve the function that each additive is to perform. Such selection and amounts are within the routine skill of the artisan. Preferred HIPS and ABS based formulations of this invention contain a flame retardant synergist.

Flame retarded HIPS and ABS based formulations contain within the range of from about 3 to about 25 wt % flame retardant compositions of this invention, the wt % being based on the total weight of the formulation. Preferred amounts are within the range of from about 5 to about 15 wt %.

The flame retardant compositions of this invention are used with flame retarding synergist. These synergists are those that are commonly used with aryl brominated flame retardants and are well know in the art. Exemplary of such synergists are iron oxide, zinc borate, or, preferably, antimony oxide synergist, such as, antimony trioxide, antimony pentoxide, potassium antimonite, sodium antimonite. The amount of flame retardant synergist, when used, generally will be in the range of up to about 12 wt % based on the total weight of the HIPS or ABS based formulation. Synergist amounts will most often fall within the range of from about 1 to about 6 wt %. Departures from the foregoing ranges of proportions are permissible whenever deemed necessary or desirable under the particular circumstances at hand, and such departures are within the scope and contemplation of this invention.

This invention includes masterbatch compositions in which flame retardant compositions of this invention are blended with conventional amounts of common additives and with HIPS or ABS in a weight ratio (HIPS or ABS: composition of the invention) in the range of, say, 1:99 to 70:30. Such masterbatch formulations need not, but may also contain at least one flame retardant synergist such as iron oxide, zinc borate, or preferably an antimony oxide flame retardant synergist such as antimony trioxide, antimony pentoxide, potassium antimonite, sodium antimonite. The thus formed masterbatches are suitable to be "let down" in HIPS or ABS to form the finished formulation.

Various known procedures can be used to prepare the blends or formulations described herein. For example the HIPS or ABS, the flame retardant composition of this invention and any other components or ingredients to be used in the finished formulation can be blended together in powder form and thereafter molded by extrusion, compression, or injection molding. Likewise the components can be mixed together in a Banbury mixer, a Brabender mixer, a roll mill, a kneader, or other similar mixing device, and then formed into the desired form or configuration such as by extrusion followed by comminution into granules or pellets, or by other known methods. Preferred flame retarded HIPS or ABS formulations described herein or those that have the capability of forming molded specimens of 3.2 mm thickness (⅛-inch thickness) that pass at least the UL 94 V0 test. Less preferred, but still having commercial utility, are those HIPS or ABS formulations having the capability of forming molded specimens 1.6 mm (1/16-inch) thick that obtain a UL 94 V2 rating. Bromination of ACTVAP or ACTSP.

The compatibility and effectiveness of the brominated ACTVAP and ACTSP of this invention in HIPS and ABS resins leads to the belief that these brominated polymers would be similarly compatible and effective in polymer alloys and blends containing HIPS or ABS. Such HIPS based alloys include, but are not limited to, PPO-HIPS. Such ABS based alloys include, but are not limited to, PC-ABS. Thus, the phrase, "HIPS and ABS" resins or formulations is meant to include HIPS and ABS containing alloys and blends.

Bromination of ACTVAP or ACTSP

In its broadest form, the processes of this invention comprise brominating ACTVAP or ACTSP with a brominating agent and in the presence of a catalytic amount of AlBr$_3$ and solvent. The bromination processes of this invention can be conducted as a batch, semi-batch or as a continuous process.

As noted previously, preferred processes of this invention can be additionally characterized as having the ACTVAP or ACTSP fed to a reactor as a solute in proximity to and contemporaneously with joint or separate feed(s) to the reactor of the brominating agent and the AlBr$_3$, such feeds being subsurface the liquid contents of the reactor (usually a liquid solvent heel at feed initiation and the crude reaction mass after feeding has been initiated) and such feeds forming, with the initial reactor contents, a crude reaction mass at least comprising brominated ACTVAP or ACTSP, AlBr$_3$, and solvent. The crude reaction mass can also contain unreacted brominating agent, especially when the desired composition is to have a very high wt % bromine content, say above about 72 wt %. Another class of impurity that will likely be present in all cases is N-bromoamines, which are suspected to give rise to undesirable color bodies and thermally labile bromine. These amine components are impurities found in ACTVAP or ACTSP and are derived from the chain transfer polymerization promoter, such as, N,N,N',N'-tetramethyl ethylenediamine.

The solvent chosen for the ACTVAP or ACTSP feed is preferably the same as the solvent that is pre-charged to the reactor before feeding begins.

The solvent used in the ACTVAP or ACTSP and reactor pre-charge can be selected from any of the following exemplary solvents; dichloromethane, dibromomethane, bromochloromethane, bromotrichloromethane, chloroform, 1,2-dibromoethane, 1,1-dibromoethane, 1-bromo-2-chloroethane, 1,2-dichloroethane, 1,1,2-tribromoethane, 1,1,2,2-tetrabromoethane, 1,2-dibromopropane, 1-bromo-3-chloropropane, 1-bromobutane, 2-bromobutane, 2-bromo-2-methylpropane, 1-bromopentane, 1,5-dibromopentane, 1-bromo-2-methylbutane, 1-bromohexane, 1-bromoheptane, bromocyclohexane, and liquid isomers, homologs, or analogs thereof and mixtures of any two or more of the foregoing. Preferred solvents are dichloromethane, dibromomethane, and 1,2-dichloroethane. Bromochloromethane is a particularly preferred solvent.

Whatever the solvent chosen is, it is important to insure that it is relatively free of water. Water in the reaction system during bromination will affect catalytic activity of the AlBr$_3$ as is well recognized in the art. Generally, it is best that the solvent contain less than about 50 ppm (weight/weight) water. In regard to water, all reactants should be dry. The brominating agent, e.g. bromine, should not contain more than about 30 ppm water. The ACTVAP or ACTSP should also be sufficiently dry so as to not introduce deleterious amounts of water into the bromination.

The amount of solvent in the ACTVAP or ACTSP feed is that amount which at least enables the formation of a free-flowing, low-viscosity solutions. In cases where the ACTVAP or ACTSP is liquid, consideration for using a solvent-free ACTVAP or ACTSP feed can be given. However, if has been found that the use of a solvent is preferred as it helps dilute the ACTVAP or ACTSP feed so that efficient bromination can occur in the reaction mass. Generally, when the solvent is bromochloromethane, from about 60 to about 80 wt % of the ACTVAP or ACTSP feed will be solvent. Preferred amounts of solvent are from about to about 65 to about 75 wt %.

The pre-charge of solvent to the reactor prior to the reactant and catalysts feeds is that amount which will provide a sufficient mass to provide an adequate heat sink to disperse the heat of the bromination reaction combined with the heat of solution of the by-product HBr so that a "heat kick" or temperature spike is minimized in the proximity of the above mentioned feeds. To this end, it is also preferred that the crude reactor contents/crude reaction mass be stirred to promote thermal and mass uniformity therein. Use of a heel from a previous run already saturated with HBr reduces the initial demand on the cooling system of the reactor and for that reason is preferred in some commercial configurations.

The AlBr$_3$ can be fed as a solute in, for example bromine, separate from the brominating agent feed, however, such a separated feeding scheme is not preferred. Process simplicity, dictates that the brominating agent be bromine and that the $AlBr_3$ and the bromine be fed as a single feed. $AlBr_3$ readily dissolves in bromine. The amount of $AlBr_3$ fed, whether separately or in combination with the bromine feed, is a catalytic amount sufficient to provide from about 0.3 to about 1 mole % $AlBr_3$ per mole of bromine fed.

Mole % $AlBr_3$=(weight of $AlBr_3$/266.7÷weight of Bromine/159.81)×100.

The amount of bromine fed is that amount required to achieve the desired bromination level sought assuming some small loss of bromine overhead with by-product HBr. Thus, for example, obtaining a 68 wt % bromine containing composition, about 2.8 moles of bromine are fed per mole of phenyl group present in a given ACTVAP or ACTSP, while, when desiring to obtain a 72 wt % bromine content, about 3.3 moles of bromine are fed per mole of phenyl group present. When obtaining very high bromine contents, say about 78 wt % bromine, about 4.5 moles of bromine are fed per mole of phenyl group present.

For example, for the base ACTSP $C_6H_5CH_2[-CH_2CH(C_6H_5)]n_{average} CH_2CH_2-C_6H_5$ the moles of phenyl groups per mole of a the base ACTSP derived from toluene is given by the following: Mole phenyl/mole ACTSP=$2+n_{average}$=$2+[(M_n-196.29)/104.15]$.

Alternatively and more conveniently one can simply charge bromine based on the equations below (this ignores the small mass of the $ACTVAP_{unbrominated}$ lost due to substitution of the protons by bromine and thus results in a slight over charge of bromine, enough to compensate for bromine lost overhead with HBr).

wt Br=wt % Br·wt $ACTVAP_{brominated}$ wt $ACTVAP_{brominated}$≈wt $ACTVAP_{unbrominated}$/(1−wt % Br)

Thus wt Br≈wt % Br·[wt $ACTVAP_{unbrominated}$/(1−wt % Br)]

and

Moles bromine=2·wt Br/159.81

Moles Bromine≈2·wt % Br*[wt $ACTVAP_{unbrominated}$/(1−wt % Br)]/159.81

It is preferred to feed, as close as is possible, just the amount of bromine needed to obtain the wt % bromine desired. If, excess bromine is fed, then at least some of that excess will be in the crude reaction mass and will have to be removed in down-stream finishing steps. However, not using excess bromine feed becomes problematic when the practitioner is seeking a very high bromine content composition, say from about 74 to 79 wt % bromine. To obtain such compositions an excess of from about 0.05% to about 2% bromine is used to provide the most favorable reaction kinetics as is practical.

Whatever the reason for the presence of excess bromine in the crude reaction mass, conventional techniques recognized in the art to remove such excess bromine can be used, e.g. using a reducing agent, e.g. sodium sulfite, to convert the bromine to water soluble bromide salts. However, it has been observed that the use such reducing agents tends to encourage the formation of an emulsion and/or rag during some of the down-stream finishing steps. Such, emulsion or rag layer causes separation difficulties and process inefficiencies. It is a feature of this invention that these emulsions and rag layers can be easily handled by the use of surfactants, e.g. sodium dodecyl sulfate, to attenuate the emulsions and rag layers, all as hereinafter described.

The ACTVAP or ACTSP, brominating agent and $AlBr_3$ feeds should be made beneath the surface of the reactor contents/reaction mass and in close proximity to each other. It is a principle of this invention that the bromination of the ACTVAP or ACTSP should occur quickly. The rates of reaction for the brominations of this invention are very fast due to reaction kinetics. Thus, in the processes of this invention, the rate-determining factor is the rate of mass transfer. Hence, the use of proximate feeds is designed so that the reactants and catalyst are close, one to the other. Another factor in assuring fast bromination is the feed of the $AlBr_3$ in solution with bromine. It is believed that the bromine preconditions the $AlBr_3$ to the active catalyst state so that the catalyst is active when first fed. One technique to insure close proximity of the feeds is to provide that the feed tubes into the reactor contents/reaction mass be held together so that they discharge in adjacent parallel or in direct, impinging directions.

Having the feeds discharge beneath the reactor content/ crude reaction mass liquid levels is beneficial as it ensures that there is heat dissipation away from the feeding area. Having a "hot spot" at the feeding area is to be avoided to the extent commercially possible. Again, stirring of the reactor contents/crude reaction mass also aids in heat dispersion.

The amount of solvent pre-charge to the reactor should be that amount necessary to accomplish the heat dissipation function without burdening the process with higher than needed material handling expenses.

The feed rate of the individual feeds should be as high as is possible considering the reactor size and design, the heat that must be handled and the cooling available to assist in heat management, the feeding apparatus available and the ability to safely handle HBr by product gas. The higher the possible feed rates, the more efficient the process.

During the co-feed, the reactor contents/crude reaction mass should be kept at a temperature within the range of from about −20° C. to about 5° C. and preferably within the range of from about −7° C. to about 0° C. The feeds to the reactor are conveniently fed at about ambient temperature. To obtain the reactor contents/crude reaction mass temperatures mentioned above, the reactor is provided with adequate cooling. The temperature should be measured as close to the feed area as is practical.

The pressure in the reactor during the bromination is not critical, super-atmospheric pressures being the norm. However, very high pressures are not preferred in the context of equipment requirements and safety issues Autogenous pressures are permissible.

Subsequent to the reactant and catalyst feeds, it is permissible to allow the reaction mass to experience a ride time to ensure that bromination has ceased. It is permissible, when brominating above 71 wt % bromine, to allow the temperature to warm to about 25° C. to help facilitate consumption and react out as much of the fed bromine as is practical. This is particularly desirable when brominating above 73% and where the practitioner decides to forgo the use of a bromine reducing agent during the initial aqueous quench so as to avoid any emulsion and rag layer difficulties. When producing highly brominated ACTVAP or ACTSP, the ride times will be longer than if lower brominated products are sought. Generally, ride times of 15 minutes to 60 minutes are suitable.

After the feeds are completed and the ride time, if any, has passed, the crude reaction mass is removed from the reactor quenched in water. The quench water can contain from about 0 to about 1000 ppm sodium dodecylsulfate, (weight/weight). The water acts to deactivate the $AlBr_3$ catalyst, while the dodecylsulfate helps break any emulsion or rag layer that is formed. Emulsions or rag layers are prevalent when sulfite based reducing agents are used to reduce unreacted bromine or when high bromine contents are sought (ACTVAP or ACTSP that are very high in bromine content, tend to form small to large and troublesome amounts of fine solids (see Bromination Example 5 having nearly 50% solids). These solids, in the absence of a surfactant, e.g. dodecylsulfate migrate to and are suspended in the aqueous layer creating an emulsion or rag layer with the aqueous phase. Addition of the surfactant results in migration of the solids to the organic phase and the formation of a thin slurry in the organic layer. It is believed that surfactants destabilize or interfere with the apparent surface charge (Zeta Potential) of the solids and prevent their aggregation and the near complete elimination of a rag layer.

As mentioned previously, if the crude reaction mass or, for that matter, any organic phase that is treated downstream of the bromination, contains unreacted bromine, such bromine content can be lowered or eliminated by the use of a reducing agent to convert the bromine to water soluble bromide. But again, the use of such reducing agents, particularly the sulfites can exacerbate emulsion and rag layer handling efforts. Therefore, it is preferred to keep the initial bromine content of the crude reaction mass down, but, if that is not practical, then it is preferred to use only enough bisulfite or sulfite needed to rid the characteristic red color of free bromine in the solution being treated, hence a colorimetric titration is in fact performed.

The quench is conveniently performed at ambient temperature and generally speaking no heating other than the heat of solution of residual HBr is needed to effect a phase separation. Since bromine and other active brominating species can be present it is preferred to minimize heating of the mixture and to limit exposure to visible light. This assists, to some extent, in helping to ensure a low thermally labile bromine content.

The water quench does not have a ride time as the deactivation of the $AlBr_3$ and the reduction of bromine is nearly instantaneous as the crude reaction mass is fed to the quench water or quench water reducing agent solution. Once the quench is complete, two defined phases are formed, an aqueous phase and an organic phase. The organic phase contains solvent and the brominated ACTVAP or ACTVSP, and will require further treatment. To initiate treatment, the organic phase is separated from the aqueous phase. After the water quench and phase separation, it is a preferred feature of this invention that the organic phase is washed with a basic sodium borohydride solution. The borohydride and its borane by-products act to convert unreacted brominating agent, e.g. bromine (if any should still be present) and N-bromoamines, into water soluble salts or, in the case of some N-bromides, to amines which have some water solubility. The use of sodium borohydride to reduce bromine in the production of brominated polystyrenes is known. However, a novel feature of preferred processes of this invention is the use of a caustic solution of sodium borohydride to reduce the amount of N-bromoamine derived color bodies that accompany the brominated ACTVAPs or ACTSP. Thus, for the processes of this invention the sodium borohydride has a primary function, i.e. reduce the amount of N-bromo amines present, and a secondary function, i.e. the reduction of any amount of bromine present. Thus, quantitatively, the amount of sodium borohydride used is that amount necessary to handle both functions.

Since $NaBH_4$ more costly than either of the sulfite or bisulfite reducing agents, it is usually preferred to use the reducing agents to effect all of the bromine removal, recognizing that the use of sulfite or bisulfite reducing agents brings with it its own emulsion and rage layer problems. In the end, it is the best practice to carefully select the amount of bromine fed against the bromine wt % of the composition sought so as to minimize the amount of unreacted bromine that will have to be handled in down-stream finishing steps.

As the caustic aqueous sodium borohydride solution is used to treat the organic phase, an aqueous phase is formed. The pH of the sodium borohydride solution is such that the formed aqueous phase has a pH between about 10 and about 14 throughout the period that the formed aqueous phase is in contact with the organic phase.

The preferred sodium borohydride content of the treating solution is within the range of from about 0.05 to about 0.5 wt % sodium borohydride, based on the total weight of the treating solution.

An important feature of the caustic sodium borohydride step is that a temperature above about 45° C. and preferably within the range of from about 54° C. to about 62° C. at one atmosphere is maintained during the treatment period. Experimentation has shown that room temperature does not obtain the high attenuation of N-bromoamine derived color bodies and thermally labile bromine that higher temperatures obtain.

The treatment temperature is maintained for at least that amount of time needed to obtain the benefits of the treatment, generally at least about 30 minutes. The practitioner can choose a lesser amount or a greater amount of time as suits his/her needs. Generally, experimentation has shown that the organic phase and aqueous mixture (during treatment, mixing is provided) will noticeably begin to thin at about mixture at 45° C. to 50° C. It is theorized that the N-bromides and any N-sulfides and/or N-oxides species present are quaternary and hence charged species or at least highly polar species. Such species are implicated in the thickening of the intimately mixed organic and basic aqueous phase. This is observed in an increased draw on the agitator drive used in the mixing. At a temperature above 45° C. and closer to 54° C. such thickening is eliminated and the draw on the drive is reduced. At temperatures below 45° C., thickening occurs and at times incomplete phase separation is observed. Once higher temperatures are achieved, the thickening phenomenon is eliminated, and phase separation is nearly instantaneous, especially when temperatures in excess of 54° C. are used.

The use of the above described aqueous caustic sodium borohydride treatment or wash can be used at any time after the water quench step and phase separation and on any recovered organic phase in the down stream, finishing sequence.

It is preferred to avoid substantial heating of the organic phase prior to the sodium borohydride treatment. Hence temperatures below 35° C. are preferred prior to the borohydride treatment.

After the final washing, the organic phase is separated from the aqueous phase and fed to hot water, say from about 90° C. to about 100° C., to flash off the solvent present and to yield solids in the aqueous phase. Temperature maintenance can be achieved by keeping the water at reflux temperature. This flashing off technique is well known in the art of producing brominated polystyrenics. The only adjustment that may be useful for producing compositions of this invention, is the use of sub atmospheric pressure during the flash when the composition produced has a low $T_g$, say lower than about 105° C. Otherwise, for such compositions, a soft mass will be formed that will be hard to handle.

Once the solvent has been flashed off, the solids are separated from the water by conventional means, e.g. filtration and the like. The separated solids are then dried by conventional drying techniques, again keeping in mind the $T_g$ of the solids. The dried solids are the finished compositions of this invention.

Another method that may be useful when dealing with low $T_g$ polymers, is to send the organic phase (after azeotropic drying to prevent corrosion issues) to a wiped film evaporator, a falling film evaporator, a continuous strip kettle or a devolitization extruder where solvent can be rapidly removed and the resulting viscous melt can be easily manipulated and then granulated or pelletized.

Analytical Methods

Known analytical methods can be used or adapted for use in assaying the characteristics of the compositions and formulations of this invention.

Total Bromine Content

Since the compositions of this invention have good, or at least satisfactory, solubility in solvents such as tetrahydrofuran (THF), the determination of the total bromine content for the compositions of this invention is easily accomplished by using conventional X-Ray Fluorescence techniques. The sample analyzed is a dilute sample, say 0.1 g+/−0.05 g in 60 mL THF. The XRF spectrometer can be a Phillips PW1480 Spectrometer. A standardized solution of bromobenzene in THF is used as the calibration standard. The total bromine values described herein and reported in the Examples are all based on the XRF analytical method.

Hunter Solution Color Value Test.

To determine the color attributes of the flame retardant compositions of this invention, use is again made of the ability to dissolve these compositions in easy-to-obtain solvents, such as chlorobenzene. The analytical method used is quite straight-forward. Weigh 5 g+/−0.1 g of the composition into a 50 mL centrifuge tube. To the tube also add 45 g+/−0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a Hunter-Lab Color Quest Sphere Spectrocolorimeter. A transmission cell having a 20-mm transmission length is used. The colorimeter is set to "Delta E-lab" to report color as ΔE and to give color values for "L", "a" and "b". Product color is determined as total color difference (ΔE) using Hunter L, a, and b scales for the 10% by weight concentrations of the product in chlorobenzene versus chlorobenzene.

Yellowness Index Hunter Colorimeter

Compositions of this invention were subjected to the analysis described in ASTM D 1925

$T_g$ Values $T_g$ values were obtained by DSC with a TA Instruments DSC Model 2920. Samples were heated to 400° C. at a rate of 10 C.°/min under nitrogen. $T_g$ is determined by noting the change in the specific heat of a polymer at the glass to rubber transition. This is a second order endothermic transition (requires heat to go through the transition). In DSC, the transition appears as a step transition and not a peak such as might be seen with a melting transition. See, *The Elements of Polymer Science and Engineering, An introductory Text for Engineers and Chemist*, Alfred Rudin, Academic Press. Orlando Fla., 1982. pg 403.

Thermogravimetric Analysis.

Thermogravimetric analysis (TGA) is also used to test the thermal behavior of the flame retardant compositions of this invention. The TGA values are obtained by use of a TA Instruments Thermogravimetric Analyzer. Each sample is heated on a Pt pan from 25° C. to about 600° C. at 10 C.°/min with a nitrogen flow of 50-60 ml/min.

Thermal Stability Test (Thermally Labile Bromine Test).

This test procedure essentially as described in U.S. Pat. No. 5,637,650. In conducting this test, each sample is run in duplicate. A 2.00 g+/−0.01 g sample is placed into a new clean 20 mm by 150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1 N NaOH and 5 drops of phenolphthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm HBr ppm: HBr=(mL $AgNO_3$ to end point)·(normality of $AgNO_3$) (80912)/(sample wt.). The tubing is thoroughly dried with nitrogen before the next analysis. Each day before the first sample, three empty clean test tubes are run as blanks to assure there is no residual hydrogen halide in the system.

GPC Molecular Weights for Brominated ACTVAP/ACTSP

The $M_w$, $M_n$, $M_z$, $M_p$ and PD values were obtained by GPC using a Waters model 510 HPLC pump and, as detectors, a Waters Refractive Index Detector, Model 410 and a Precision Detector Light Scattering Detector, Model PD2000. The columns were Waters, [mu]Styragel, 500 Å, 10,000 Å and 100,000 Å. The auto-sampler was a Shimadzu, Model Sil 9A. A polystyrene standard ($M_w$ =185,000) was routinely used to verify the accuracy of the light scattering data. The solvent used was tetrahydrofuran, HPLC grade. Based on isolated 1,3-diphenylpropane and 1,3,5-triphenylpentane adducts, and the mode of separation is size exclusion, peaks are identified according to their order of elution as 1,3-diphenylpropane, 1,3,5-triphenylpentane, 1,3,5,7-tetraphenylheptane, 1,3,5,7,9-pentaphenylnonane, etc. The individual peaks of the oligomeric material are then assigned theoretical molecular weight values. A calibration curve is constructed using these theoretical values and their corresponding retention times. Based on this calibration, the overall distribution data is calculated and reported. The test procedure used entailed dissolving 0.015 g-0.020 g of sample in 10 mL of THF. An aliquot of this solution is filtered and 50 L is injected on the columns. The separation was analyzed using software provided by Precision Detectors for the PD 2000 Light Scattering Detector.

GPC Molecular Weights for Base ACTVAP and ACTSP

The $M_w$, $M_n$, $M_p$, $M_z$ and PD values were obtained by GPC using a modular system with a Shimadzu autosampler (model SIL-9), a Shimadzu refractive index detector (model RID-6A), a Waters HPLC pump (model 510) and a Waters TCM column heater. The columns were Polymer Labs (Varian) Oligopore columns, 300 mm by 7.5 mm, part number 1113-6520, or equivalent. The solvent used was tetrahydrofuran, HPLC grade. The test procedure used entailed dissolving 0.10 g of sample in 10 mL of THF. An aliquot of this solution is filtered and 50 µL is injected on the columns. The calculations were performed by the Viscotek Omnisec, version 4.2.0.237 (or equivalent) gel permeation chromatography (GPC) data collection and processing system.

Analytical Methods for Molding Articles:

HDT was determined by ASTM D 648; Vicat, ° C. by ASTM D 649; Izod Impact by ASTM D 256; Melt Flow Index by ASTM D 1238; and UL-94, ⅛" (32 mm) rating by UL 94.

The following Examples illustrate principles of this invention and are not intended to limit the generic scope of this invention.

EXAMPLES

ACTSP Examples 1-10

General: A spherical glass 12 liter creased reactor with oil jacket was equipped with a reflux condenser, distillation head, submerged thermal couple, bottom drain valve, and stainless steel internal cooling coils. Temperature was tightly maintained at a set point via PID controller that regulates water flow to the cooling coils. Vigorous agitation was accomplished by means of a overhead stirring assembly comprised of 19 mm OD glass shaft with two sets of glass impellers, one set pitched and the other flat, fused to the shaft. The reactor was essentially free of all wetted PTFE parts or other polymeric fluorinated materials or elastomers.

In all examples the reactor was maintained under an inert dry $N_2$ atmosphere during all operations. The reactor was charged with the chain transfer agent(s) through a dip leg by means of a diaphragm pump. Alkyl lithium, metal alkoxides (when used), additional solvents and the amine promoter (TMEDA) were all fed subsurface to the stirred chain transfer agent(s) in that order through the same dip leg. Styrene was pumped into the reactor by means of a metering pump through a 3" (76.2 mm) cylindrical column (1.75" (44.45 mm) dia.≈100 g) of Basic Aluminum Oxide (EMD Chemicals, Aluminum oxide 90, mesh 70-230, column chromatography grade) and delivered as a fine stream or spray above the surface of the reaction mixture through two ¹⁄₁₆" (16 mm) OD feed nozzles.

Example 1

ACTSP-1 $M_w$=483 PD=1.32

Toluene, 4323 g (5.0 liters, 46.92 mol) was charged to the reactor previously heated to 70° C. by means of the hot oil jacket. The PID controller operating the cooling coils was set for 70° C. As the content of the reactor was heated to the reaction temperature, 63.94 g n-BuLi solution (2M in cyclohexane, 0.165 mol) was charged through the dip leg below the surface of the gently agitated (300 rpm) toluene reaction mixture. The feed line was then flushed with 75 ml of anhydrous toluene. Next a previously prepared solution comprised of potassium t-butoxide (18.28 g, 0.163 mol), TMEDA (94.26 g, 0.811 mol), and toluene (421.27 g, 4.7 mol) was introduced forming a characteristic bright red color of a TMEDA complexed benzyl anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2523 g of styrene (99+%, 24.22 mol) were fed over 150 minutes. The well-calibrated metering pump was programmed to feed at a constant rate of 16.82 g/min. Anhydrous cyclohexane (2×200 ml) was charged to the styrene feed system to flush the alumina bed and complete the styrene feed. The styrene feed to the reactor was deemed complete when no further heat of reaction was observed, generally signified by the automated closing of the solenoid valve on the reactor's cooling coils.

The reaction mixture was quenched at 70° C. with a 50 ml aliquot of deoxygenated water resulting in a water white turbid mixture. The reaction mixture was washed with deoxygenated water (3×650 ml) phase cuts could be made after some settling time. Water and any rag or emulsion was removed through the bottom drain valve.

The temperature of the oil jacket was increased to 130° C. while the control valve to the cooling coils was turned off. Residual moisture was removed over a period of approximately two hours as the pot temperature climbed from 65° C. to 115° C.; while water, cyclohexane and some toluene were distilled. An analytical sample was removed, GPC analysis provided the following data: $M_p$: 197, $M_n$: 331, $M_w$: 368, $M_z$: 406, PD: 1.11.

The crude reaction mixture, 7027 g, was stripped in a continuous operation of excess toluene to yield 3231 g of the concentrated product stream that had the following GPC analysis: $M_p$: 300. $M_n$: 367, $M_w$: 483, $M_z$: 634, PD: 1.32. The continuous strip was accomplished by means of wiped film evaporator (WFE, aka. Pope Still). WFE operating conditions: feed rate=1.33 L/hr, oil jacket temperature=185° C., Pressure=50 mm Hg and condenser temperature=0° C. An additional 440 g of toluene was collected in a dry ice trap, while the cold finger condensed 3280 g of a mixture of toluene and 1,3-diphenylpropane free of structural isomers.

Example 2

ACTSP-2 $M_w$=496 PD=1.32

Toluene, 4763 g (5.5 liters, 51.69 mol) was charged to the reactor previously heated to 80° C. by means of the hot oil jacket. The PID controller operating the cooling coils was set for 80° C. As the solvent was heated to the reaction temperature, 111.65 g n-BuLi solution (2M in cyclohexane, 0.288 mol) was charged through the dip leg below the surface of the gently agitated (300 rpm) toluene reaction mixture. The feed line was then flushed with 75 ml of anhydrous toluene. Once the pot temperature reached 80° C., 49.46 g of N,N,N',N'-tetramethylethylenediamine (TMEDA, 0.426 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2951 g of styrene (99+%, 28.33 mol) were fed over 180 minutes. The well-calibrated metering pump was programmed to feed at a constant rate of 16.4 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The PID temperature controller was left at 80° C. and water was fed through the cooling coils while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (3×650 ml). Phase cuts were rapid and required little settling time. Water and any rag or emulsion was removed through the bottom drain valve.

The temperature of the oil jacket was increased to 130° C. while the control valve to the cooling coils was turned off. Cyclohexane, residual moisture and toluene were distilled through a simple distillation head (1 atm.) until a pot temperature of 115° C. was observed. An aliquot was removed for analysis via GPC ($M_p$: 195, $M_n$: 300, $M_w$: 416, $M_z$: 624, PD: 1.38)

The crude reaction mixture, 804 g, was stripped via continuous operation of excess toluene to yield 4011 g of an intermediate product stream that had the following GPC analysis: $M_p$: 191, $M_n$: 314, $M_w$: 426, $M_z$: 615, PD: 1.40. The continuous strip was accomplished by means of wiped film evaporator (WFE, aka. Pope Still). WFE operating conditions were as follows: feed rate=1.33 L/hr, oil jacket temperature=190° C., Pressure=55 mm Hg and condenser temperature=0° C. An additional 918 g of toluene was collected in a dry ice trap, while the cold finger condensed 2942 g of a mixture of toluene and 1,3-diphenylpropane.

A second pass of the 855.4 g of the concentrate through the WFE produced 698 g of an oligomeric mixture with the following GPC profile: $M_p$: 298, $M_n$: 375, $M_w$: 496. $M_z$: 715, PD: 1.32. WFE operating conditions were as follows: feed rate=1.33 L/hr, oil jacket temperature=200° C., Pressure=10 mm Hg and condenser temperature=0° C. A mixture (155 g) of 1,3-Diphenylpropane and traces of its structural isomers (methylated diphenylethanes) were collected as a distillate.

Example 3

ACTSP-3 $M_w$=530 PD=1.47

Toluene, 4758 g (5.5 liters, 51.64 mol) was charged to the reactor previously heated to 90° C. by means of the hot oil jacket. The PID controller operating the cooling coils was set for 90° C. As the solvent was heated to the reaction temperature, 73.37 g n-BuLi solution (2M in cyclohexane, 0.189 mol) was charged through the dip leg below the surface of the gently agitated (300 rpm) toluene reaction mixture. The feed line was then flushed with 75 ml of anhydrous toluene. Once the pot temperature reached 90° C., 32.72 g of N,N,N',N'-tetramethylethylenediamine (TMEDA, 0.282 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2933 g of styrene (99+%, 28.16 mol) were fed over 150 minutes. The well-calibrated metering pump was programmed to feed at a constant rate of 19.5 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The PID temperature controller was set at 80° C. and water was fed through the cooling coils while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (3 times, 650 ml). Phase cuts were rapid and required little settling time. Water and any rag or emulsion was removed through the bottom drain valve.

The temperature of the oil jacket was increased to 130° C. while the control valve to the cooling coils was turned off. Cyclohexane, residual moisture and toluene were distilled through a simple distillation head (1 atm.) until a pot temperature of 115° C. was observed. An aliquot was removed for analysis via GPC ($M_p$: 196, $M_n$: 363, $M_w$: 555, $M_z$: 977, PD: 1.53)

The crude reaction mixture, 8062 g, was stripped via continuous operation of excess toluene to yield 3837 g of the concentrated product stream that had the following GPC analysis: $M_p$: 196, $M_n$: 359, $M_w$: 530, $M_z$: 868, PD: 1.47. The continuous strip was accomplished by means of wiped film evaporator (WFE, aka. Pope Still). WFE operating conditions were as follows: feed rate=1.33 L/hr, oil jacket temperature=175° C., Pressure=70 mm Hg and condenser temperature=0° C. An additional 1182 g of toluene was collected in a dry ice trap, while the cold finger condensed 2896 g of a mixture of toluene and 1,3-diphenylpropane.

Example 4

ACTSP-4 $M_w$=584 PD=1.50

Toluene, 5801 g (6.7 liters, 62.95 mol) was charged to the reactor previously heated to 115° C. by means of the hot oil jacket. The PID controller operating the cooling coils was set for 115° C. As the solvent was heated to near reflux, 78.31 g n-BuLi solution (2M in cyclohexane, 0.202 mol) was charged through the dip leg below the surface of the gently agitated (300 rpm) toluene reaction mixture. The feed line was then flushed with 75 ml of anhydrous toluene. Once the pot temperature reached 110° C., 24.73 g of N,N,N',N'-tetramethylethylenediamine (TMEDA, 0.213 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2543 g of styrene (99+%, 24.42 mol) were fed over 120 minutes. The well-calibrated metering pump was programmed to feed at a constant rate of 21.2 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The PID temperature controller was set to 80° C. and water was fed through the cooling coils while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (3 times, 650 ml). Phase cuts were rapid and required little settling time. Water and any rag or emulsion was removed through the bottom drain valve.

The temperature oil jacket was increased to 130° C. while the control valve to the cooling coils was turned off. Cyclohexane, residual moisture and toluene were distilled through a simple distillation head (1 atm.) until a pot temperature of 115° C. was observed. An aliquot was removed for analysis via GPC ($M_p$: 185, $M_n$: 322, $M_w$: 457, $M_z$: 648, PD: 1.42)

The crude reaction mixture, 8528 g, was stripped via continuous operation of excess toluene to yield 3253 g of the concentrated product stream that had the following GPC analysis: $M_p$: 300, $M_n$: 389, $M_w$: 584, $M_z$: 887, PD: 1.50. The continuous strip was accomplished by means of wiped film evaporator (WFE, aka. Pope Still). WFE operating conditions were as follows: feed rate=1.33 L/hr, oil jacket temperature=170° C., Pressure=95 mm Hg and condenser temperature=0° C. An additional 1154 g of toluene was collected in a dry ice trap, while the cold finger condensed 4092 g of a mixture of toluene and 1,3-diphenylpropane.

Example 5

ACTSP-5 $M_w$=715 PD=1.40

Toluene, 5848 g (6.76 liters, 63.46 mol) was charged to the reactor previously heated to 115° C. by means of the hot oil jacket. The PID controller operating the cooling coils was set for 115° C. As the solvent was heated to near reflux, 78. g n-BuLi solution (2M in cyclohexane, 0.202 mol) was charged through the dip leg below the surface of the gently agitated (300 rpm) toluene reaction mixture. The feed line was then flushed with 75 ml of anhydrous toluene. Once the pot temperature reached 110° C., 24.0 g of N,N,N',N'-tetramethylethylenediamine (TMEDA, 0.207 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2548 g of styrene (99+%, 24.46 mol) were fed over 110 minutes. The well-calibrated metering pump was programmed to feed at a constant rate of 23.2 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The PID temperature controller was set to 80° C. and water was fed through the cooling coils while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (three times, 650 ml). Phase cuts were rapid and required little settling time. Water and any rag or emulsion was removed through the bottom drain valve.

The temperature oil jacket was increased to 130° C. while the control valve to the cooling coils was turned off. Cyclohexane, residual moisture and toluene were distilled through a simple distillation head (1 atm.) until a pot temperature of 115° C. was observed. An aliquot was removed for analysis via GPC ($M_p$: 194, $M_n$: 382, $M_w$: 595, $M_z$: 998, PD: 1.56)

The crude reaction mixture, 8660 g, was stripped via continuous operation of excess toluene to yield 3217 g of an intermediate product stream that had the following GPC analysis: $M_p$: 297, $M_n$: 399, $M_w$: 613, $M_z$: 1003, PD: 1.54. The continuous strip was accomplished by means of wiped film evaporator (WFE, aka. Pope Still). WFE operating conditions were as follows: feed rate=1.33 L/hr, oil jacket temperature=165° C., Pressure=90 mm Hg and condenser temperature=0° C. An additional 813 g of toluene was collected in a dry ice trap, while the cold finger condensed 4600 g of a mixture of toluene and 1,3-diphenylpropane.

A second pass of the concentrate through the WFE produced 2453 g of an oligomeric mixture with the following GPC profile: $M_p$: 400, $M_n$: 512, $M_w$: 715, $M_z$: 1084, PD: 1.4. WFE operating conditions were as follows: feed rate=1.33 L/hr, oil jacket temperature=205° C., Pressure=0.6 mm Hg and condenser temperature=0° C. A mixture (69 g) of 1,3-Diphenylpropane and its structural isomers (methylated diphenylethanes) were collected as a distillate.

Example 6

ACTSP-6 $M_w$=740 PD=1.66

Toluene, 4758 g (5.5 liters, 51.64 mol) was charged to the reactor previously heated to 80° C. by means of the hot oil jacket. The PID controller operating the cooling coils was set for 80° C. As the solvent was heated to the reaction temperature, 70.2 g n-BuLi solution (2M in cyclohexane, 0.181 mol) was charged through the dip leg below the surface of the gently agitated (300 rpm) toluene reaction mixture. The feed line was then flushed with 75 ml of anhydrous toluene. Once the pot temperature reached 80° C., 32.99 g of N,N,N',N'-tetramethylethylenediamine (TMEDA, 0.284 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2933 g of styrene (99+%, 28.16 mol) were fed over 180 minutes. The well-calibrated metering pump was programmed to feed at a constant rate of 16.3 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The PID temperature controller was left at 80° C. and water was fed through the cooling coils while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (3 times, 650 ml). Phase cuts were rapid and required little settling time. Water and any rag or emulsion was removed through the bottom drain valve.

The temperature oil jacket was increased to 130° C. while the control valve to the cooling coils was turned off. Cyclohexane, residual moisture and toluene were distilled through a simple distillation head (1 atm.) until a pot temperature of 115° C. was observed. An aliquot was removed for analysis via GPC ($M_p$: 192, $M_n$: 425, $M_w$: 727, $M_z$: 1398, PD: 1.71)

The crude reaction mixture, 7931 g, was stripped via continuous operation of excess toluene to yield 3490 g of the concentrated product stream that had the following GPC analysis: $M_p$: 295, $M_n$: 446, $M_w$: 740, $M_z$: 1357, PD: 1.66. The continuous strip was accomplished by means of wiped film evaporator (WFE, aka. Pope Still). WFE operating conditions were as follows: feed rate=1.33 L/hr, oil jacket temperature=185° C., Pressure=70 mm Hg and condenser temperature=0° C. An additional 917 g of toluene was collected in a dry ice trap, while the cold finger condensed 3340 g of a mixture of toluene and 1,3-diphenylpropane.

Example 7

ACTSP-7 $M_w$=800 PD=1.39

Toluene 4758 g, (5.5 liters, 51.64 mol) was charged to the reactor previously heated to reflux and azeotropically dried over a 4 hour period; Karl Fisher moisture analysis indicated 15 ppm residual $H_2O$. The dried toluene was cooled to 75° C. with the oil jacket and PID controller operating the cooling coils both set at that temperature. Upon cooling to the set point temperature, 109.3 g n-BuLi solution (2M in cyclohexane, 0.282 mol) was charged through the dip leg below the surface of the gently agitated (300 rpm) toluene reaction mixture. The feed line was then flushed with 75 ml of anhydrous toluene. Next, 48.7 g of N,N,N',N'-tetramethylethylenediamine (TMEDA, 0.419 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. Additionally 350 ml of anhydrous toluene was fed at a constant rate during the anionic chain transfer polymerization process. Reactor agitation was increased to 510 rpm and 2940 g of styrene (99+%, 28.23 mol) were fed over 180 minutes. The well-calibrated metering pump was programmed to feed at a constant rate of 16.3 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the coiling coils.

The set point of PID temperature controller was maintained at 75° C. and water was fed through the cooling coils as needed while the flow of the hot oil was altered to bypass the reactor jacket. The reaction mixture was quenched at 75° C. with a 50 ml aliquot of deoxygenated water resulting in a water white turbid mixture. The reaction mixture was washed with deoxygenated water (3 times, 650 ml). Phase cuts were rapid and required little settling time. Water and any rag or emulsion was removed through the bottom drain valve.

The temperature of the oil jacket was increased to 130° C. while the control valve to the cooling coils was turned off. Cyclohexane, residual moisture and toluene were distilled through a simple distillation apparatus. An aliquot was removed for analysis via GPC ($M_p$: 192, $M_n$: 447, $M_w$: 713, $M_z$: 1196, PD: 1.59)

The crude reaction mixture, 8068 g, was stripped via continuous operation of excess toluene to yield 3380 g of an intermediate product stream that had the following GPC analysis: $M_p$: 297, $M_n$: 476, $M_w$: 733, $M_z$: 1191, PD: 1.54. The continuous strip was accomplished by means of wiped film evaporator (WFE, aka. Pope Still). WFE operating conditions were as follows: feed rate=1.33 L/hr, oil jacket temperature=185° C., Pressure=55 mm Hg and condenser temperature=0° C. Additionally 1935 g of toluene was collected in a dry ice trap, while the cold finger condensed 261 g of a mixture of toluene and 1,3-diphenylpropane.

A second pass of the concentrate through the WFE produced 2715 g of an oligomeric mixture with the following GPC profile: $M_p$: 398, $M_n$: 577, $M_w$: 800, $M_z$: 1186, PD: 1.39. WFE operating conditions were as follows: feed rate=1.33 L/hr, oil jacket temperature=185° C., Pressure=0.1 mm Hg and condenser temperature=0° C. A mixture (388 g) of 1,3-Diphenylpropane and its structural isomers (methylated diphenylethanes) were collected as a distillate.

Example 8

ACTSP-8 $M_w$=817 PD=1.30

Toluene, 4332 g (5.0 liters, 47.02 mol) was charged to the reactor previously heated to 75° C. by means of the hot oil Jacket. The PID controller operating the cooling coils was set for 70° C. As the content of the reactor was heated to the reaction temperature, 94 g n-BuLi solution (2M in cyclohexane, 0.242 mol) was charged through the dip leg below the surface of the gently agitated (300 rpm) toluene reaction mixture. The feed line was then flushed with 75 ml of anhydrous toluene. Next a previously prepared solution comprised of potassium t-butoxide (27.32 g, 0.243 mol), TMEDA (35.95 g, 0.309 mol), THF (59.93 g, 0.831 mol) and toluene (433.36 g, 4.7 mol) was introduced forming a characteristic bright red color of a TMEDA complexed benzyl anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2528 g of styrene (99+%, 24.27 mol) were fed over 150 minutes. The well-calibrated metering pump was programmed to feed at a constant rate of 16.81 g/min. Anhydrous cyclohexane (2×200 ml) was charged to the styrene feed system to flush the alumina bed and complete the styrene feed. The styrene feed to the reactor was deemed complete when no further heat of reaction was observed, generally signified by the automated closing of the solenoid valve on the reactor's cooling coils.

The reaction mixture was quenched at 70° C. with a 50 ml aliquot of deoxygenated water resulting in a water white turbid mixture. The reaction mixture was washed with deoxygenated water (3 times, 650 ml) phase cuts though not easy could be made after some settling time. Water and any rag or emulsion was removed through the bottom drain valve.

The temperature of the oil jacket was increased to 130° C. while the control valve to the cooling coils was turned off. Residual moisture was removed over a period of approximately two hours as the pot temperature climbed from 65 to 115° C.; water, cyclohexane, THF and toluene taken overhead. An aliquot was removed for analysis via GPC provided the following data: $M_p$: 405, $M_n$: 509, $M_w$: 790, $M_z$: 1180, PD: 1.55.

The crude reaction mixture, 7215 g, was stripped in a continuous operation of excess toluene to yield 2894 g of an intermediate product stream that had the following GPC analysis: $M_p$: 402, $M_n$: 530, $M_w$: 767, $M_z$: 1039, PD: 1.45. The continuous strip was accomplished by means of wiped film evaporator (WFE, aka. Pope Still). WFE operating conditions: feed rate=1.33 L/hr, oil jacket temperature=185°

C., Pressure=55 mm Hg and condenser temperature=0° C. An additional 1435 g of toluene was collected in a dry ice trap, while the cold finger condensed 2884 g of a mixture of toluene and 1,3-diphenylpropane.

A second pass of the product stream through the WFE produced 2415 g of a oligomeric mixture with the following GPC profile: $M_p$: 409, $M_n$: 645, $M_w$: 817, $M_z$: 1009, PD: 1.27. WFE operating conditions: feed rate=1.33 L/hr, oil jacket temperature=185° C., Pressure=0.1 mm Hg and condenser temperature=0° C. 271 g of 1,3-diphenylpropane free of structural isomers was collected as a distillate.

Example 9

ACTSP-9 $M_w$=928 PD=1.43

Toluene 4758 g, (5.5 liters, 51.64 mol) was charged to the reactor previously heated to reflux and azeotropically dried over a 4 hour period; Karl Fisher moisture analysis indicated 16 ppm residual $H_2O$. The dried toluene was cooled to 80° C. with the oil jacket and PID controller operating the cooling coils both set at that temperature. Upon cooling to the set point temperature, 71.00 g n-BuLi solution (2M in cyclohexane, 0.183 mol) was charged through the dip leg below the surface of the gently agitated (300 rpm) toluene reaction mixture. The feed line was then flushed with 75 ml of anhydrous toluene. Next, 33.2 g of N,N,N',N'-tetramethylethylenediamine (TMEDA, 0.286 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. An additional 350 ml of anhydrous toluene was fed at a constant rate during the anionic chain transfer polymerization process. Reactor agitation was increased to 510 rpm and 2939 g of styrene (99+%, 28.22 mol) were fed over 180 minutes. The well-calibrated metering pump was programmed to feed at a constant rate of 16.3 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the cooling coils.

The set point of PID temperature controller was maintained at 80° C. and water was fed through the cooling coils as needed while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (3×650 ml). Phase cuts were rapid and required little settling time. Water and any rag or emulsion was removed through the bottom drain valve.

The temperature of the oil jacket was increased to 130° C. while the control valve to the cooling coils was turned off. Cyclohexane, residual moisture and toluene were distilled through a simple distillation head (1 atm.) until a pot temperature of 115° C. was observed. An aliquot was removed for analysis via GPC ($M_p$: 306, $M_n$: 505, $M_w$: 824, $M_z$: 1314, PD: 1.63)

The crude reaction mixture, 7589 g, was stripped via continuous operation of excess toluene to yield 3382 g of an intermediate product stream that had the following GPC analysis: $M_p$: 305, $M_n$: 539, $M_w$: 852, $M_z$: 1342, PD: 1.58. The continuous strip was accomplished by means of wiped film evaporator (WFE, aka. Pope Still). WFE operating conditions were as follows: feed rate=1.33 L/hr, oil jacket temperature=185° C., Pressure=55 mm Hg and condenser temperature=0° C. An additional 1430 g of toluene was collected in a dry ice trap, while the cold finger condensed 2634 g of a mixture of toluene and 1,3-diphenylpropane.

A second pass of the concentrate through the WFE produced 3012 g of an oligomeric mixture with the following GPC profile: $M_p$: 409, $M_n$: 648, $M_w$: 928, $M_z$: 1390, PD: 1.43. WFE operating conditions were as follows: feed rate=1.33 L/hr, oil jacket temperature=205° C., Pressure=0.6 mm Hg and condenser temperature=0° C. A mixture (455 g) of 1.3-Diphenylpropane and its structural isomers (methylated diphenylethanes) were collected as a distillate.

Example 10

ACTSP-10 $M_w$=1194 PD=1.77

Toluene, 5798 g (6.7 liters, 62.92 mol) was charged to the reactor previously heated to 110° C. by means of the hot oil jacket. The PID controller operating the coiling coils was set for 115° C. As the solvent was heated to the reaction temperature, 79.6 g n-BuLi solution (2M in cyclohexane, 0.205 mol) was charged through the dip leg below the surface of the gently agitated (300 rpm) toluene reaction mixture. The feed line was then flushed with 75 ml of anhydrous toluene. Once the pot temperature reached 110° C., 24.2 g of N,N,N',N'-tetramethylethylenediamine (TMEDA, 0.208 mol) was charged to the reactor through the subsurface feed line forming the characteristic bright red color of TMEDA complexed benzyl lithium anion with concomitant off gassing of butane. The subsurface line was flushed with a second 75 ml aliquot of anhydrous toluene via metering pump. Additionally 350 ml of anhydrous toluene was fed at a constant rate during the anionic chain transfer polymerization process. Reactor agitation was increased to 510 rpm and 2544 g of styrene (99+%, 24.43 mol) were fed over 80 minutes. The well-calibrated metering pump was programmed to feed at a constant rate of 31.8 g/min. Anhydrous cyclohexane (2×200 ml) was charged to the styrene feed system to flush the alumina bed. The styrene feed to the reactor was deemed complete when no further heat of reaction was observed generally signified by the closing of the automated control valve on the coiling coils.

The PID temperature controller was set at 80° C. and water was fed through the cooling coils while the flow of the hot oil was altered to bypass the reactor jacket. The reaction mixture was quenched at 80° C. with a 50 ml aliquot of deoxygenated water resulting in a water white turbid mixture. The reaction mixture was washed with deoxygenated water (3 times, 650 ml). Phase cuts were rapid and required little settling time. Water and any rag or emulsion was removed through the bottom drain valve.

The temperature oil jacket was increased to 130° C. while the control valve to the cooling coils turned off. Cyclohexane, residual moisture and toluene were distilled through a simple distillation head (1 atm.) until a pot temperature of 115° C. was observed. An aliquot was removed for analysis via GPC ($M_p$: 397, $M_n$: 652, $M_w$: 1174, $M_z$: 1853, PD: 1.80)

The crude reaction mixture, 8967 g, was stripped via continuous operation of excess toluene to yield 2846 g of the concentrated product stream that had the following GPC analysis: $M_p$: 295, $M_n$: 674, $M_w$: 1194, $M_z$: 1877, PD: 1.77. The continuous strip was accomplished by means of wiped film evaporator (WFE, aka. Pope Still). WFE operating conditions were as follows: feed rate=1.33 L/hr, oil jacket temperature=160° C., Pressure=90 mm Hg and condenser temperature=0° C. Additionally 1024 g of toluene was collected in a dry ice trap, while the cold finger condensed 5002 g of a mixture of toluene and 1,3-diphenylpropane.

Examples 11 and 12 Continuous Mode

Example 11

ACTSP-11 $M_w$=4054 PD=2.14

The apparatus was a glass 200 mL oil-jacketed baffled cylindrical reactor with an overflow port equipped with a nitrogen inlet, overhead stainless steel stirring shaft with pitched blade turbine impeller, and a thermal couple. The reactor was also outfitted with two subsurface feed lines: (1) a stainless steel 1/8" (32 mm) O.D. line for introducing a mixture of styrene and toluene; and (2) a stainless steel 1/16" (16 mm) O.D. line for feeding a mixture formed from butyl lithium, TMEDA and toluene. The 1/16" (16 mm) line was threaded through a 1/4" (6.4 mm) line to prevent entanglement with the mechanical stirring apparatus during the course of a run. The tip of the 1/16 inch (16 mm) feed line was directed just below the impeller. The overflow port was directed downward at a 22.5° angle, and was attached by means of a 13 mm Ace Thread® Teflon® connection to a 24-inch long glycol jacketed 15 mm O.D. glass tube. The other end of the 15 mm glass tube was connected to a 2 liter, glycol-jacketed stirred reactor by means of a second 13 mm Ace Thread® Teflon® connection (neither Teflon® couplings were wetted parts). The overflow reactor was equipped with an all-glass overhead stirring apparatus, bottom drain valve, chilled water condenser, and nitrogen oil-bubbler outlet. The overflow line and reactor were heated to 100° C. with glycol.

In a stirred, oven-dried pear-shaped 500 ml flask under an inert $N_2$ atmosphere at ambient temperature, an organolithium mixture was formed from 91.75 g (106 m L, 1.09 mol) of anhydrous toluene, 42.98 mL of 16.5 wt % (5.28 g, 0.0824 mol contained alkyl lithium) n-butyl lithium in cyclohexane and 8.62 g (11.19 mL, 0.0742 mole) TMEDA; this mixture was stirred with a glass coated (no PTFE) magnetic stirring bar. About one half of the solution was drawn through a 1/16" (16 mm) stainless steel three-way ball valve into an oven dried 100 ml glass syringe mounted on a syringe pump. After infusion of the syringe, the ball valve was lined up such that the path from the syringe to the 1/16" (16 mm) subsurface feed line in the reactor was open and the path to the magnetically stirred flask was closed. During the course of a reaction, the infusion of the syringe with the second half of the mixture was achieved by lining the 3-way ball valve such that the path to the flask was open and the path to the reactor was closed.

At the start of the run, the reactor was charged with 100 mL of anhydrous toluene and heated to 110° C. Meanwhile, 547 g (602 mL, 5.25 mol) of styrene and 1734 g (2000 mL, 20.6 mol) of anhydrous toluene were combined, mixed and then charged to a $N_2$-blanketed 3000 ml graduated cylinder reservoir. The toluene-styrene mixture was pumped to the reactor with a laboratory-metering pump through a column of anhydrous basic alumina until the first drop or two were seen entering the reactor; the feed was stopped and stirring in the reactor was initiated (~400 rpm). Butyl lithium in cyclohexane was charged dropwise into the reactor by means of a 1.0 mL syringe. The addition was stopped when the characteristic red color of the polystyryllithium anion appeared (indicating anhydrous conditions). Next, about 4.8 g (0.012 mol) of 16.5 wt % n-butyl lithium and 1.3 g (0.011 mol) of TMEDA were charged to the reactor. The feed rates of both feeds (toluene-styrene mixture and organolithium mixture) were preset (toluene-styrene mixture: 6.28 mL/min; organolithium mixture: 0.386 mL/min) and the pumps were calibrated such that 200 ml of combined feed passed through the reactor per hour (two reactor volumes per hour) for a 30-minute residence time. The process was conducted for about 195 minutes at 110° C.

Samples were collected approximately every 30 minutes after the first 45-minute period. It was found that within two reactor volumes, the system had reached steady state conditions. The GPC molecular weight distribution of the first fraction collected was as follows: $M_w$=1992, $M_p$=2209, $M_n$=716 Daltons, $M_z$=3512 and Polydispersity=2.78. A typical steady state fraction analyzed as follows: $M_w$=4146, $M_p$=4507, $M_n$=1656, $M_z$=7134 Daltons and Polydispersity=2.50. GPC analysis of a composite of steady state fractions analyzed after stripping toluene and 1-3-diphenylpropane was as follows: $M_w$=4051, $M_p$=3822, $M_n$=1879, $M_z$=6897 Daltons and Polydispersity=2.15

Example 12

ACTSP-12 $M_w$=2288 PD=1.91

The run in this Example repeats that of Example 11, except as described herein. The toluene-styrene mixture was made from 547 g (602 mL, 5.25 mol) of styrene and 1816 g (2100 mL, 21.58 mol) of anhydrous toluene. The organolithium mixture was formed from 177.27 g (2.11 mol, 205 mL) of anhydrous toluene, 90.26 mL of 16.5 wt % (11.08 g, 0.173 mol contained alkyl lithium) n-butyl lithium in cyclohexane and 24.81 g (19.10 mL, 0.1644 mole) TMEDA. After the red color of the polystyryllithium anion appeared, about 10 g (0.024 mol) of 16.5 wt % n-butyl lithium and 2.6 g (0.022 mol) of TMEDA were charged to the reactor. The feed rates of both feeds were preset (toluene-styrene mixture: 6.28 mL/min; organolithium mixture: 0.764 mL/min). The combined feed rate was one reactor volume (200 ml) per 28.4 minutes. The process was conducted for about 419 minutes at 110° C.-113° C.

Samples were collected approximately every 30 minutes after the first 45 minute period. It was found that within two reactor volumes, the system had reached steady state conditions. The GPC molecular weight distribution of the first fraction collected was as follows: $M_w$=2154, $M_p$=2293, $M_n$=953, $M_z$=3510 Daltons and Polydispersity=1.65. A typical steady state fraction analyzed as follows: $M_w$=2395, $M_p$=2410, $M_n$=1026, $M_z$=4246 Daltons and Polydispersity=2.34. GPC analysis of a composite of steady state fractions analyzed after stripping toluene and 1-3-diphenylpropane was as follows: $M_w$=2288, $M_p$=2094, $M_n$=1200, $M_z$=3767 Daltons and Polydispersity=1.91.

BROMINATION

General Description:

Bromochloromethane (BCM) was azeotropically dried (5-10 ppm moisture by Karl Fisher). All feed lines, feed tanks and glassware were dried (oven dried at 130° C. min 2 hour where appropriate) and purged over-night prior to use in the bromination reaction. All glassware, feed lines, and feed tanks are maintained under a $N_2$ atmosphere during the course of the set-up and the operation of the bromination reactor.

The amount of $AlBr_3$ catalyst (commercially available) needed to make a 0.25 mole % (calculated using the formula

[moles AlBr$_3$/moles Br$_2$]*100%=0.25% mole % AlBr$_3$) solution of active catalyst was weighed and then transferred to oven dried reagent bottles in a nitrogen-purged glove box. By active catalyst, it is meant that amount of catalyst above any additional amount that would be otherwise deactivated by moisture either in the bromine itself or any other process stream involved in the bromination reaction. Bromine (5-10 ppm moisture content) was pumped into the reagent bottle containing the AlBr$_3$ and then stirred with a PTFE coated magnetic stirring bar for 30 minutes to assure homogenous dissolution of the catalyst. The 0.25 mole % AlBr$_3$ in bromine solution was then transferred to a graduated feeding vessel placed on a large capacity laboratory balance.

The anionic chain-transfer styrene polymer (ACTSP) used was dissolved in dry (5-10 ppm moisture) BCM to make a 25-wt % solution. The solution was then charged to a graduated feeding vessel. The 0.25 mole % AlBr$_3$ in bromine and the 25 wt % ACTSP in BCM solution are co-fed via separate peristaltic pumps through ⅛" (32 mm) O.D. feed lines to a well-stirred fresh or recycle heel of anhydrous BCM at 0° C.-10° C. The relative feed rates are constantly monitored such that ratio of the two reagents fed remains constant or near constant during the course of the electrophilic bromination reaction.

Bromination Equipment Set-up:

A 5 L oil jacketed flask (bromination reactor) was equipped with an over head glass stirrer shaft, PTFE stirring paddle, a water-cooled condenser, thermo-well, nitrogen inlet, and bottom drain valve. The reactor was vented through a calcium sulfate moisture trap to a well-stirred caustic scrubber to absorb co-product HBr and entrained Br$_2$. Additionally the reactor was outfitted with three inlet lines: 1) ¼" (64 mm) O.D. PTFE BCM feed for initial feed of BCM to the reactor (the BCM can be either fresh or a BCM recycle heel from a previous run); 2) ⅛" (32 mm) O.D. substrate/BCM subsurface feed line; and 3) ⅛" (32 mm) O.D. Br$_2$/AlBr$_3$ subsurface feed line. The AlBr$_3$/Br$_2$ and ACTSP/BCM feed lines are secured such that both inlet lines discharge their contents in close proximity creating a locally high reagent concentration. The bromination reactor was completely covered with aluminum foil to exclude light and the reaction was conducted in a darkened ventilation hood.

The bromination reactor was placed above a 6-liter water quench pot with a ⅜" (96 mm) O.D. PTFE drain line that connects the bottom drain valve of the bromination reactor to the quench pot to allow for direct transfer of the bromination reactor's contents. The quench pot was oil jacketed and equipped with an over-head stirring mechanism, thermowell, sodium bisulfite addition funnel and was baffled for intimate mixing of organic and aqueous phases. The quench pot had a nitrogen inlet and was purged to a caustic scrubber. The quench pot had a bottom drain valve to enable transfer of the pot's contents to an intermediate 5 liter storage vessel.

The intermediate storage vessel was piped to transfer its contents to a wash kettle. The wash kettle was a 6-liter oil-jacketed, baffled reactor outfitted with an over-head stirrer, reverse phase Dean Stark trap, thermocouple and bottom drain valve.

Alternative pieces of equipment are suitable for recovering the brominated product as a solid and essentially free of BCM. Product recovery can be effected by distilling off the BCM in an oil jacketed resin kettle to form a concentrate. The kettle is located to enable its concentrate product to in turn be dropped as a melt into a bucket of well-stirred (high shear) cold water. The stirring produces a granular (chopped) product (after oven drying) that is suitable for compounding into a formulation. The alternative set-up provides a water-containing vessel into which unconcentrated product is fed accompanied by the concomitant azeotropic removal of BCM. The granules from the first and the precipitate from the second, are passed through a vacuum oven for drying Materials with glass transition temperature (T$_g$) below 100° C. are rinsed with methanol before drying in the oven at a temperature 15° C. below their T$_g$.

A recapitulation of process parameters and analytical data on the final compositions contained for each of the Bromination Examples is found in Table I.

Bromination Example 1

To the 5 L bromination reactor described above was charged 867 g of dry BCM (azeotropically dried to 5-10 ppm moisture, Karl Fisher). The BCM was cooled in the dark to −1° C. and a previously prepared 25 wt % solution comprised of 334 g of ACTSP-1 (From ACTSP Example 1 M$_w$=483, PD=1.32) and 1002 g of dry BCM was charged to a dry, 2000 ml N$_2$ blanketed graduated cylinder outfitted with a ⅛" (32 mm) PTFE feed line placed to transfer the entire content of the cylinder by means of a peristaltic metering pump to the bromination reactor. The previously prepared AlBr$_3$ (0.25 mol %) in bromine (1356 g) was transferred via a peristaltic pump into a 1.5 liter graduated cylinder. This feed vessel was maintained under a N$_2$ atmosphere and was outfitted with a ⅛" (32 mm) PTFE feed line placed to transfer the desired amount of bromine solution by means of a peristaltic metering pump to the bromination reactor.

The two reagents are co-fed at predetermine relative rates such that the entire content of the two feeds are charged and simultaneously completed in 180 minutes. The co-feed was interrupted and the entire content of the reactor transferred to the quench pot on 60-minute intervals resulting in a 30-minute average residence time for the reagents. A new heel was created in the bromination flask of 867 g of dry BCM each time prior to resumption of the cofeed. Ample cooling was provided through out the operation such that the reaction temperature remains close to −3° C. Upon completion of the feed the reaction was allowed to stir for an additional 5 minutes to allow unreacted bromine to be consumed. The reaction mixture was transferred (gravity) to the 6 L quench pot through the bottom drain valve and the ⅜" (96 mm) O.D. PTFE transfer line.

The quench pot was previously charged with 1000 ml tap water (25° C.) and stirred at 400 rpm to assure intimate mixing of the organic and aqueous phase. Upon completion of the transfer, 10% Na$_2$SO$_3$ solution was added until the red color was eliminated and a near water white mixture was observed. The quench was exothermic and a 10° C. temperature rise was observed. Agitation was stopped and the organic phase allowed to settle. The lower organic phase was transferred to a 5 L storage vessel containing 1000 ml of 10% NaOH and 1.0 g NaBH$_4$.

This two-phase system was then transferred to the 6 L wash kettle and refluxed (62° C.) for 30 minutes. Agitation was interrupted and the bottom organic layer cut from the reactor. The organic layer was returned to the completely drained kettle and washed twice with 1000 ml of tap water to a pH of 10. The solution was then azeotropically dried by means of a reverse phase Dean-Stark trap. The content of the reactor was pumped to a 1 liter resin kettle while stripping BCM at atmospheric pressure. Upon completion of the transfer, the BCM strip was continued at atmospheric pressure until the pot temperature reached 150° C. BCM was then further removed in vaccuo to an ending condition of 150° C. and <5 mm Hg.

The content of the resin kettle was drained into a 2.5-gallon plastic pail of rapidly stirred (high sheer blade, 2100 rpm) cold water to grind the product into a coarse powder. The product was collected in a 3000 ml coarse flitted Büchner funnel, rinsed with methanol and then dried in a vacuum oven (25° C.) to yield 955 g of the brominated product.

Bromination Example 2

The procedure of Bromination Example 1 was used except that 2000 g of a 25 wt % solution of ACTSP-1 (From ACTSP Example 1 Mw=483, PD=1.32) in dry BCM was co-fed with 257 g of 0.25 mole % AlBr3 in bromine to a heel of 3850 g of BCM at a constant relative feed rate so that the average residence time in the reactor was 30 minutes. The product was dried at 45° C. in a vacuum oven. The procedure produced 1688 g of product.

Bromination Example 3

The procedure of Bromination Example 1 was used except that 2000 g of a 25 wt % solution of ACTSP-1 (From ACTSP Example 1 $M_w$=483, PD=1.32) in dry BCM was co-fed with 2846 g of 0.25 mole % AlBr3 in bromine to a heel of 3850 g of BCM at a constant relative feed rate so that the average residence time in the reactor was 30 minutes. The product was dried at 65° C. in a vacuum oven. The procedure produced 1823 g of product.

Bromination Example 4

The procedure of Bromination Example 1 was used except that 1500 g of a 25 wt % solution of ACTSP-2 (From ACTSP Example 2 $M_w$=496, PD=1.32) in dry BCM was co-fed with 2895 g of 0.25 mole % AlBr3 in bromine to a heel of 3500 g of BCM at a constant uninterrupted relative feed rate so that the average residence time in the reactor was 90 minutes. The crude product mixture was heterogeneous and required the addition of 0.125 g of sodium dodecyl sulfate to each aqueous wash to break the resulting emulsions and achieve the desired phase cut. The product was precipitated from water at 95° C. with concomitant stripping of BCM. The product was dried at 130° C. in a vacuum oven. The procedure produced 1645 g of product.

Bromination Example 5

The procedure of Bromination Example 1 was used except that 1165 g of a 25 wt % solution of ACTSP-2 (From ACTSP Example 2 $M_w$=496, PD=1.32) in dry BCM was co-fed with 2330 g of 0.25 mole % AlBr3 in bromine to a heel of 3200 g of BCM at a constant uninterrupted relative feed rate so that the average residence time in the reactor during the feed was 90 minutes. The reaction mixture was allowed to stir for an additional 60 minutes after completion of the co-feed. The crude product mixture was heterogeneous and required the addition of 0.125 grams of sodium dodecyl sulfate to each aqueous wash to break the resulting emulsions and achieve the desired phase cut. The washed product mixture was filtered and the resulting filter cake washed with BCM and dried in a vacuum oven at 150° C. to yield 557 g of a white solid. The filtrate and wash BCM were combined and the soluble portion of the product precipitated from water at 95° C. with concomitant stripping of BCM. The BCM-soluble product fraction was dried at 130° C. in a vacuum oven to yield 693 g of a white solid.

Bromination Example 6

The procedure of Bromination Example 1 was used except that 2000 g of a 25 wt % solution of ACTSP-3 (From ACTSP Example 3 $M_w$=530, PD=1.47) in dry BCM was co-fed with 2846 g of 0.25 mole % AlBr3 in bromine to a heel of 4000 g of BCM at a constant relative feed rate so that the average residence time in the reactor was 30 minutes. The product was dried at 65° C. in a vacuum oven. The procedure produced 1730 g of product.

Bromination Example 7

The procedure of Bromination Example 1 was used except that 2000 g of a 25 wt % solution of ACTSP-3 (From ACTSP Example 3 $M_w$=530, PD=1.47) in dry BCM was co-fed with 2704 g of 0.25 mole % AlBr3 in bromine to a heel of 4000 g of BCM at a constant relative feed rate so that the average residence time in the reactor was 30 minutes. The product was dried at 45° C. in a vacuum oven. The procedure produced 1751 g of product.

Bromination Example 8

The procedure of Bromination Example 1 was used except that 2000 g of a 25 wt % solution of ACTSP-3 (From ACTSP Example 3 $M_w$=530, PD=1.47) in dry BCM was co-fed with 2846 g of 0.25 mole % AlBr3 in bromine to a heel of 4200 g of BCM at a constant relative feed rate so that the average residence time in the reactor was 30 minutes. The product was dried at 45° C. in a vacuum oven. The procedure produced 1853 g of product.

Bromination Example 9

The procedure of Bromination Example 1 was used except that 1336 g of a 25 wt % solution of ACTSP-4 (From ACTSP Example 4 $M_w$=584, PD=1.50) in dry BCM was co-fed with 1356 g of 0.25 mole % AlBr3 in bromine to a heel of 2600 g of BCM at a constant relative feed rate so that the average residence time in the reactor was 30 minutes. The product was dried at 30° C. in a vacuum oven. The procedure produced 933 g of product.

Bromination Example 10

The procedure of Bromination Example 1 was used except that 2000 g of a 25 wt % solution of ACTSP-4 (From ACTSP Example 4 $M_w$=584, PD=1.50) in dry BCM was co-fed with 2333 g of 0.25 mole % AlBr3 in bromine to a heel of 4000 g of BCM at a constant relative feed rate so that the average residence time in the reactor was 30 minutes. The product was dried at 35° C. in a vacuum oven. The procedure produced 1540 g of product.

Bromination Example 11

The procedure of Bromination Example 1 was used except that 2000 g of a 25 wt % solution of ACTSP-4 (From ACTSP Example 4 $M_w$=584, PD=1.50) in dry BCM was co-fed with 2846 g of 0.25 mole % AlBr3 in bromine to a heel of 4200 g of BCM at a constant relative feed rate so that the average residence time in the reactor was 30 minutes.

The product was dried at 60° C. in a vacuum oven. The procedure produced 1677 g of product.

Bromination Example 12

The procedure of Bromination Example 1 was used except that 2000 g of a 25 wt % solution of ACTSP-4 (From ACTSP Example 4 $M_w$=584, PD=1.50) in dry BCM was co-fed with 3167 g of 0.25 mole % $AlBr_3$ in bromine to a heel of 3850 g of BCM at a constant relative feed rate so that the average residence time in the reactor was 30 minutes. The product was dried at 65° C. in a vacuum oven. The procedure produced 1640 g of product.

Bromination Example 13

The procedure of Bromination Example 1 was used except that 2000 g of a 25 wt % solution of ACTSP-5 (From ACTSP Example 5 $M_w$=715, PD=1.40) in dry BCM was co-fed with 2125 g of 0.25 mole % $AlBr_3$ in bromine to a heel of 3800 g of BCM at a constant relative feed rate so that the average residence time in the reactor was 30 minutes. The product was dried at 60° C. in a vacuum oven. The procedure produced 1462 g of product.

Bromination Example 14

The procedure of Bromination Example 1 was used except that 2000 g of a 25 wt % solution of ACTSP-5 (From ACTSP Example 5 $M_w$=715, PD=1.40) in dry BCM was co-fed with 2571 g of 0.25 mole % $AlBr_3$ in bromine to a heel of 4000 g of BCM at a constant relative feed rate so that the average residence time in the reactor was 30 minutes. The product was dried at 70° C. in a vacuum oven. The procedure produced 1601 g of product.

Bromination Example 15

The procedure of Bromination Example 1 was used except that 1600 g of a 25 wt % solution of ACTSP-5 (From ACTSP Example 5 $M_w$=715, PD=1.40) in dry BCM was co-fed with 2276 g of 0.25 mole % $AlBr_3$ in bromine to a heel of 3500 g of BCM at a constant relative feed rate so that the average residence time in the reactor was 30 minutes. The product was precipitated from water at 95° C. with concomitant stripping of BCM. The product was dried at 90° C. in a vacuum oven. The procedure produced 1427 g of product.

Bromination Example 16

The procedure of Bromination Example 1 was used except that 2000 g of a 25 wt % solution of ACTSP-6 (From ACTSP Example 6 $M_w$=740, PD=1.66) in dry BCM was co-fed with 2846 g of 0.25 mole % $AlBr_3$ in bromine to a heel of 4200 g of BCM at a constant relative feed rate so that the average residence time in the reactor was 30 minutes. The product was precipitated from water at 92° C. with concomitant stripping of BCM. The product was dried at 90° C. in a vacuum oven. The procedure produced 1820 g of product.

Bromination Example 17

The procedure of Bromination Example 1 was used except that 1500 g of a 25 wt % solution of ACTSP-7 (From ACTSP Example 7 $M_w$=800, PD=1.39) in dry BCM was co-fed with 1836 g of 0.25 mole % $AlBr_3$ in bromine to a heel of 3000 g of BCM at a constant and uninterrupted relative feed rate so that the average residence time in the reactor was 90 minutes. The product was precipitated from water at 95° C. with concomitant stripping of BCM. The product was dried at 90° C. in a vacuum oven. The procedure produced 1250 g of product.

Bromination Example 18

The procedure of Bromination Example 1 was used except that 1500 g of a 25 wt %/o solution of ACTSP-7 (From ACTSP Example 7 $M_w$=800, PD=1.39) in dry BCM was co-fed with 2135 g of 0.25 mole % $AlBr_3$ in bromine to a heel of 3000 g of BCM at a constant and uninterrupted relative feed rate so that the average residence time in the reactor was 90 minutes. The product was precipitated from water at 95° C. with concomitant stripping of BCM. The product was dried at 110° C. in a vacuum oven. The procedure produced 1400 g of product.

Bromination Example 19

The procedure of Bromination Example 1 was used except that 1500 g of a 25 wt % solution of ACTSP-7 (From ACTSP Example 7 $M_w$=800, PD=1.39) in dry BCM was co-fed with 2135 g of 0.25 mole % $AlBr_3$ in bromine to a heel of 3000 g of BCM at a constant and uninterrupted relative feed rate so that the co-feed was completed in 180 minutes. Upon completion of the feed the reaction mixture was warmed to 25° C. over a 1 hr period, thus providing an average residence time in excess of 120 minutes. The product mixture was transferred to the quench pot and no sulfite was added to treat unreacted bromine. Unreacted bromine was converted to bromide during the caustic $NaBH_4$ wash. The product was precipitated from water at 95° C. with concomitant stripping of BCM. The product was dried at 110° C. in a vacuum oven. The procedure produced 1401 g of product.

Bromination Example 20

The procedure of Bromination Example 1 was used except that 1500 g of a 25 wt % solution of ACTSP-7 (From ACTSP Example 7 $M_w$=800, PD=1.39) in dry BCM was co-fed with 2375 g of 0.25 mole % $AlBr_3$ in bromine to a heel of 3000 g of BCM at a constant and uninterrupted relative feed rate so that the co-feed was completed in 180 minutes. Upon completion of the feed the reaction mixture was warmed to 25° C. over a 1 hr period, thus providing an average residence time in excess of 120 minutes. The crude product mixture was heterogeneous and required the addition of 0.125 grams of sodium dodecyl sulfate to each aqueous wash to break the resulting emulsions and achieve the desired phase cut. The product mixture was transferred to the quench pot and no sulfite was added to treat unreacted bromine. Unreacted bromine was converted to bromide during the caustic $NaBH_4$ wash. The product was precipitated from water at 95° C. with concomitant stripping of BCM. The product was dried at 110° C. in a vacuum oven. The procedure produced 1460 g of product.

Bromination Example 21

The procedure of Bromination Example 1 was used except that 1500 g of a 25 wt % solution of ACTSP-8 (From ACTSP Example 8 $M_w$=817, PD=1.26) in dry co-fed with 1836 g of 0.25 mole % $AlBr_3$ in bromine to a heel of 3000 g of BCM at a constant and uninterrupted relative feed rate so that the average residence time in the reactor was 90 minutes. The product was precipitated from water at 95° C. with concomitant stripping of BCM. The product was dried at 100° C. in a vacuum oven. The procedure produced 1230 g of product.

Bromination Example 22

The procedure of Bromination Example 1 was used except that 1500 g of a 25 wt % solution of ACTSP-8 (From ACTSP Example 8 $M_w$=817, PD=1.26) in dry BCM was co-fed with 2135 g of 0.25 mole % $AlBr_3$ in bromine to a heel of 3000 g of BCM at a constant and uninterrupted relative feed rate so that the average residence time in the reactor was 90 minutes. The product was precipitated from water at 95° C. with concomitant stripping of BCM. The product was dried at 110° C. in a vacuum oven. The procedure produced 1320 g of product.

Bromination Example 23

The procedure of Bromination Example 1 was used except that 1500 g of a 25 wt % solution of ACTSP-8 (From ACTSP Example 8 $M_w$=817, PD=1.26) in dry BCM was co-fed with 2659 g of 0.25 mole % $AlBr_3$ in bromine to a heel of 3000 g of BCM at a constant and uninterrupted relative feed rate so that the average residence time in the reactor was 90 minutes. The crude product mixture was heterogeneous and required the addition of 0.125 grams of sodium dodecylsulfate to each aqueous wash to break the resulting emulsions and achieve the desired phase cut. The product was precipitated from water at 95° C. with concomitant stripping of BCM. The product was dried at 130° C. in a vacuum oven. The procedure produced 1440 g of product.

Bromination Example 24

The procedure of Bromination Example 1 was used except that 1500 g of a 25 wt % solution of ACTSP-9 (From ACTSP Example 9 $M_w$=928, PD=1.43) in dry BCM was co-fed with 1836 g of 0.25 mole % $AlBr_3$ in bromine to a heel of 3000 g of BCM at a constant and uninterrupted relative feed rate so that the average residence time in the reactor was 90 minutes. The product was precipitated from water at 95° C. with concomitant stripping of BCM. The product was dried at 100° C. in a vacuum oven. The procedure produced 1250 g of product.

Bromination Example 25

The procedure of Bromination Example 1 was used except that 1500 g of a 25 wt % solution of ACTSP-9 (From ACTSP Example 9 $M_w$=928, PD=1.43) in dry BCM was co-fed with 2135 g of 0.25 mole % $AlBr_3$ in bromine to a heel of 3000 g of BCM at a constant and uninterrupted relative feed rate so that the average residence time in the reactor was 90 minutes. The product was precipitated from water at 95° C. with concomitant stripping of BCM. The product was dried at 110° C. in a vacuum oven. The procedure produced 1388 g of product.

Bromination Example 26

The procedure of Bromination Example 1 was used except that 1500 g of a 25 wt % solution of ACTSP-9 (From ACTSP Example 9 $M_w$=928, PD=1.43) in dry BCM was co-fed with 2659 g of 0.25 mole % AlBr3 in bromine to a heel of 3000 g of BCM at a constant and uninterrupted relative feed rate so that the average residence time in the reactor was 90 minutes. The crude product mixture was heterogeneous and required the addition of 0.125 grams of sodium dodecylsulfate to each aqueous wash to break the resulting emulsions and achieve the desired phase cut. The product was precipitated from water at 95° C. with concomitant stripping of BCM. The product was dried at 130° C. in a vacuum oven. The procedure produced 150 g of product.

Bromination Example 27

The procedure of Bromination Example 1 was used except that 1400 g of a 25 wt % solution of ACTSP-10 (From ACTSP Example 9 $M_w$=1194, PD=1.77) in dry BCM was co-fed with 1800 g of 0.25 mole % $AlBr_3$ in bromine to a heel of 3200 g of BCM at a constant relative feed rate so that the average residence time in the reactor was 30 minutes. The product was precipitated from water at 95° C. with concomitant stripping of BCM. The product was dried at 105° C. in a vacuum oven. The procedure produced 89 g of product.

Bromination Example 28

The procedure of Bromination Example 1 was used except that 1400 g of a 25 wt % solution of ACTSP-10 (From ACTSP Example 9 $M_w$=1194, PD=1.77) in dry BCM was co-fed with 2045 g of 0.25 mole % $AlBr_3$ in bromine to a heel of 4000 g of BCM at a constant relative feed rate so that the average residence time in the reactor was 30 minutes. The product was precipitated from water at 95° C. with concomitant stripping of BCM. The product was dried at 120° C. in a vacuum oven. The procedure produced 1245 g of product.

Bromination Example 29

The procedure of Bromination Example 1 was used except that 1392 g of a 25 wt % solution of ACTSP-11 (From ACTSP Example 11 $M_w$=4051, PD=2.15) in dry BCM was co-fed with 1479 g of 0.25 mole % $AlBr_3$ in bromine to a heel of 3000 g of BCM at a constant relative feed rate so that the average residence time in the reactor was 30 minutes. The product was precipitated from water at 95° C. with concomitant stripping of BCM. The product was dried at 130° C. in a vacuum oven. The procedure produced 980 g of product.

Bromination Example 30

The procedure of Bromination Example 1 was used except that 1360 g of a 25 wt % solution of ACTSP-12 (From ACTSP Example 12 $M_w$=2288, PD=1.91) in dry BCM was co-fed with 1445 g of 0.25 mole % $AlBr_3$ in bromine to a heel of 3200 g of BCM at a constant relative feed rate so that the average residence time in the reactor was 30 minutes. The product was precipitated from water at 95° C. with concomitant stripping of BCM. The product was dried at 115° C. in a vacuum oven. The procedure produced 1002 g of product.

TABLE I

| Bromination example | 1 | 2 | 3 | 4 | 5 | 5a | 5b | 6 | 7 | 8 | 9 | 10 |
|---|---|---|---|---|---|---|---|---|---|---|---|---|
| ACTSP Example | 1 | 1 | 1 | 2 | 2 | | | 3 | 3 | 3 | 4 | 4 |
| ACTSP Mw | 483 | 483 | 483 | 496 | 496 | | | 530 | 530 | 530 | 584 | 584 |
| ACTSP PD | 1.32 | 1.32 | 1.32 | 1.32 | 1.32 | | | 1.47 | 1.47 | 1.47 | 1.50 | 1.50 |
| ACTSP (g) | 334 | 500 | 500 | 375 | 291.3 | | | 500 | 500 | 500 | 334 | 500 |
| Moisture (ppm) | 58 | 66 | 66 | 5 | 5 | | | 26 | 26 | 26 | 14 | 11 ppm |
| Wt % in BCM | 25 | 25 | 25 | 25 | 25 | | | 25 | 25 | 25 | 25 | 25 |
| BCM in Feed (g) | 1002 | 1500 | 1500 | 1125 | 873.9 | | | 1500 | 1500 | 1500 | 1002 | 1500 |
| Bromine (g) | 1356.24 | 2571.43 | 2846.15 | 2895.3 | 2330.4 | | | 2846.15 | 2703.7 | 2846.15 | 1356.24 | 2333.3 |
| BCM in Reactor (g) | 2600 | 3850 | 4200 | 3500 | 3200 | | | 4000 | 4000 | 4200 | 2600 | 4000 |
| Rxn Temp (range ° C.) | −3 (−4~−2) | −2 (−4~−1) | −2 (−4~−1) | −5 (−6~−2) | −3 (−6~−1.1) | | | −5 (−6~−3.5) | −4 (−5.3~−3) | −4 (−6~−2) | −3 (−4~−2) | −4 (−6~−1) |
| Average residence time(min) | 30 | 30 | 30 | 90 | >120 | 557 part a | 0 part b | 30 | 30 | 30 | 30 | 30 |
| Solids from ML (g) | 103 | 0 | 0 | 0 | | 557 | 693 | 50.3 | 0 | 0 | 0 | 180.5 |
| Mass of Product | 954.9 | 1688.11 | 1823.53 | 1550 | | (a + b) 1306 | | 1730.2 | 1751.9 | 1853.2 | 933.05 | 1540.75 |
| Theoretical Yield | 1012 | 1806 | 1923 | 1645 | | | | 1819 | 1880 | 1976 | 1044 | 1678 |
| % Yield | 105% | 93% | 95% | 94% | 96% | | | 98% | 93% | 94% | 89% | 103% |

| Bromination example Product Analyses | 1 | 2 | 3 | 4 | 5a | 5b | 6 | 7 | 8 | 9 | 10 |
|---|---|---|---|---|---|---|---|---|---|---|---|
| Residual BCM (ppm) | 270 | 430 | 220 | 960 | 2830 | 90 | 240 | | 17600 | 3750 | 310 |
| XRF wt % Br | 68.3 | 73.2 | 74.3 | 78.4 | N/A | 78.7 | 75.1 | 72.5 | 74.7 | 68.5 | 71.1 |
| bromine per ring | 2.7 | 3.5 | 3.7 | 4.6 | | 4.7 | 3.8 | 3.4 | 3.7 | 2.8 | 3.1 |
| Tg (° C.) (DSC) | 37.7 | 57.4 | 74.66 | 139 | 222 | 140.86 | 72.3 | 60.76 | 52.44 | 38.06 | 43.23 |
| TGA (N2) | | | | | | | | | | | |
| 1% Wt. Loss (° C.) | 230 | 259 | 273 | 322 | 320 | 331 | 268 | 258 | 154 | 169 | 212 |
| 5% Wt. Loss (° C.) | 290 | 308 | 327 | 365 | 362 | 367 | 318 | 311 | 300 | 283 | 292 |
| 10% Wt. Loss (° C.) | 317 | 334 | 354 | 380 | 375 | 380 | 342 | 337 | 335 | 314 | 323 |
| 50% Wt. Loss (° C.) | 390 | 391 | 395 | 418 | 415 | 412 | 395 | 398 | 394 | 398 | 384 |
| Thermal HBr 300° C. (ppm) | 73 | 349 | 248 | 314 | 208 | 363 | 463 | 333 | 315 | 131 | <50 |
| GPC | | | | | | | | | | | |
| Mw | 1552 | 2092 | 2180 | 3041 | N/A | 3066 | 1561 | 2359 | 2410 | 2014 | 2250 |
| Mn | 958 | 1819 | 1880 | 2605 | N/A | 2596 | 1391 | 2013 | 1700 | 1560 | 2040 |
| Mz | 2060 | 2549 | 2787 | 3713 | N/A | 3792 | 1922 | 2945 | 4250 | 2677 | 2585 |
| PD | 1.6 | 1.15 | 1.16 | 1.17 | N/A | 1.18 | 1.12 | 1.17 | 1.4 | 1.29 | 1.1 |
| Color (YI Powder) | | 2.82 | 3.66 | | | | | | | | |
| Color (solution) | | | | | | | | | | 6.88 | |
| L | 100.36 | 98.98 | 98.55 | 98.69 | N/A | 97.4 | 99.08 | 97.32 | 96.98 | 96.79 | 96.2 |
| a | 0.01 | −0.06 | −0.1 | −0.65 | N/A | −1.52 | −0.47 | −0.19 | −0.32 | −0.96 | −0.9 |
| b | 0.74 | 2.47 | 3.33 | 4.9 | N/A | 9.97 | 6.5 | 6.07 | 7.79 | 5.7 | 8.08 |
| ΔE | 0.82 | 2.67 | 3.63 | 5.11 | N/A | 10.41 | 6.58 | 6.64 | 8.36 | 6.61 | 8.97 |

| Bromination example | 11 | 12 | 13 | 14 | 15 | 16 | 17 | 18 | 19 | 20 |
|---|---|---|---|---|---|---|---|---|---|---|
| ACTSP Example | 4 | 4 | 5 | 5 | 5 | 6 | 7 | 7 | 7 | 7 |
| ACTSP Mw | 584 | 584 | 715 | 715 | 715 | 740 | 800 | 800 | 800 | 800 |

TABLE 1-continued

| | 11 | 12 | 13 | 14 | 15 | 16 | 17 | 18 | 19 | 20 |
|---|---|---|---|---|---|---|---|---|---|---|
| ACTSP PD | 1.50 | 1.50 | 1.40 | 1.40 | 1.40 | 1.66 | 1.39 | 1.39 | 1.39 | 1.39 |
| ACTSP (g) | 500 | 500 | 500 | 500 | 400 | 500 | 375 | 375 | 375 | 375 |
| Moisture (ppm) | 11 | 11 | 9 | 9 | 9 | 11 | 19 | 19 | 19 | 19 |
| Wt % in BCM | 25 | 25 | 25 | 25 | 25 | 25 | 25 | 25 | 25 | 25 |
| BCM in Feed (g) | 1500 | 1500 | 1500 | 1500 | 1200 | 1500 | 1125 | 1125 | 1125 | 1125 |
| Bromine (g) | 2846.15 | 3166.67 | 2125 | 2571.43 | 2276 | 2846.15 | 1836.2 | 2134.6 | 2134.6 | 2375 |
| BCM in Reactor (g) | 4200 | 3850 | 3800 | 4000 | 3500 | 4200 | 3000 | 3000 | 3000 | 3000 |
| Rxn Temp (range ° C.) | -4 (-6--1) | -2 (-4--1) | -5.5 (-7--3) | -5 (-6--3) | -3 (-4--1) | -4 (-6--2) | -4 (-5--2) | -4 (-5--2) | -4 (-5--2) | -4 (-5--2) |
| Average residence time(min) | 30 | 30 | 30 | 30 | 30 | 30 | 90 | 90 | >120 | >120 |
| Solids from ML (g) | 33.37 | 113.04 | 0 | 0 | 0 | 0 | 0 | 0 | 0 | 0 |
| Mass of Product | 1677.7 | 1641.0 | 1462.9 | 1601.5 | 1426.8 | 1820.0 | 1250.0 | 1400.1 | 1401.0 | 1460 |
| Theoretical Yield | 1880 | 1986 | 1582 | 1736 | 1556 | 2000 | 1307 | 1448 | 1465 | 1563 |
| % Yield | 91% | 88% | 92% | 92% | 92% | 91% | 96% | 97% | 96% | 93% |

| Bromination example Product Analyses | 11 | 12 | 13 | 14 | 15 | 16 | 17 | 18 | 19 | 20 |
|---|---|---|---|---|---|---|---|---|---|---|
| Residual BCM (ppm) | 270 | 190 | 250 | 220 | 7520 | 1200 | 29 | 0 | 84 | <30 |
| XRF wt % Br | 74.1 | 75.5 | 68.4 | 71.7 | 74.2 | 76.2 | 72.3 | 74.7 | 75.2 | 76.5 |
| bromine per ring | 3.6 | 3.9 | 2.8 | 3.2 | 3.7 | 4.1 | 3.3 | 3.8 | 3.9 | 4.2 |
| Tg (° C.) (DSC) | 73.11 | 93.11 | 75.33 | 87.94 | 111.1 | 102.02 | 104.6 | 131.7 | 136.9 | 158.1 |
| TGA (N₂) | | | | | | | | | | |
| 1% Wt. Loss (° C.) | 236 | 265 | 316 | 314 | 210 | 273 | 273 | 339 | 341 | 347 |
| 5% Wt. Loss (° C.) | 306 | 334 | 351 | 348 | 351 | 339 | 320 | 366 | 370 | 375 |
| 10% Wt. Loss (° C.) | 335 | 357 | 363 | 361 | 365 | 360 | 339 | 378 | 380 | 386 |
| 50% Wt. Loss (° C.) | 388 | 401 | 393 | 393 | 401 | 406 | 382 | 411 | 410 | 416 |
| Thermal HBr 300° C. (ppm) | 357 | 199 | 251 | <50 | 254 | 160 | 347 | 163 | 158 | <50 |
| GPC | | | | | | | | | | |
| Mw | 2100 | 2990 | 2630 | 2840 | 3109 | 4000 | 3050 | 3280 | 3510 | 3599 |
| Mn | 1200 | 2440 | 2170 | 2180 | 2665 | 3160 | 2530 | 2720 | 2663 | 2780 |
| Mz | 3713 | 3963 | 3460 | 3918 | 3815 | 5460 | 3720 | 4020 | 4815 | 4871 |
| PD | 1.75 | 1.23 | 1.21 | 1.30 | 1.17 | 1.30 | 1.20 | 1.21 | 1.32 | 1.29 |
| Color (YI Powder) | | | | | | | 6.80 | 3.98 | 5.70 | 8.98 |
| Color (solution) | | | | | | | | | | |
| L | 98.34 | 98.48 | 95.02 | 95.18 | 100.3 | 99.58 | 100.05 | 100.95 | 99.5 | 98.61 |
| a | -1.95 | -1.94 | -1.79 | -1.49 | -2.59 | -0.18 | 0.05 | -0.11 | -0.36 | -0.76 |
| b | 8.77 | 11.48 | 14.58 | 15.67 | 7.56 | 1.45 | 0.46 | 0.51 | 2.18 | 4.76 |
| ΔE | 9.14 | 11.74 | 15.51 | 16.46 | 8.00 | 1.52 | 0.47 | 1.08 | 2.27 | 5.02 |

| Bromination Example | 21 | 22 | 23 | 24 | 25 | 26 | 27 | 28 | 29 | 30 |
|---|---|---|---|---|---|---|---|---|---|---|
| ACTSP Mw | 817 | 817 | 817 | 928 | 928 | 928 | 1194 | 1194 | 4054 | 2288 |
| ACTSP PD | 1.27 | 1.27 | 1.27 | 1.43 | 1.43 | 1.43 | 1.77 | 1.77 | 2.15 | 1.91 |
| ACTSP (g) | 375 | 375 | 375 | 375 | 375 | 375 | 350 | 350 | 348 | 340 |
| Moisture (ppm) | 89 | 89 | 89 | 12 | 12 | 12 | 12 | 12 | 145 | 94 |
| Wt % in BCM | 25 | 25 | 25 | 25 | 25 | 25 | 25 | 25 | 25 | 25 |
| BCM in Feed (g) | 1125 | 1125 | 1125 | 1125 | 1125 | 1125 | 1050 | 1050 | 1044 | 1020 |
| Bromine (g) | 1836 | 2135 | 2659 | 1836 | 2135 | 2659 | 1800 | 2045 | 1479 | 1445 |
| BCM in Reactor (g) | 3000 | 3000 | 3000 | 3000 | 3000 | 3500 | 3200 | 4000 | 3200 | 3000 |

TABLE 1-continued

| | 21 | 22 | 23 | 24 | 25 | 26 | 27 | 28 | 29 | 30 |
|---|---|---|---|---|---|---|---|---|---|---|
| Rxn Temp (range ° C.) | −4 (−6~−2.5) | −4 (−6~−2.5) | −4 (−6~−2.5) | −5 (−6~−2) | −5 (−6~−2) | −4.7 (−6~−2) | −3.8 (−4~−2) | −3.8 (−4~−2) | −3.8 (−5~−3) | −3.8 (−4~−2) |
| Average residence time(min) | 90 | 90 | 90 | 90 | 90 | 90 | 30 | 30 | 30 | 30 |
| Solids from ML (g) | 0 | 0 | 0 | 0 | 0 | 0 | 0 | 0 | 0 | 0 |
| Mass of Product | 1230 | 1320 | 1440 | 1250 | 1388 | 1500 | 891 | 1244.53 | 980.5 | 1002.25 |
| Theoretical Yield | 1339 | 1442 | 1563 | 1339 | 1500 | 1563 | 1296 | 1346 | 1094 | 1063 |
| % Yield | 92% | 92% | 92% | 93% | 93% | 96% | 69% | 92% | 90% | 94% |
| Bromination example Product Analyses | | | | | | | | | | |
| Residual BCM (ppm) | <50 | 30 | 70 | 0 | 0 | 90 | <50 | 160 | 1550 | 320 |
| XRF wt % Br | 72.5 | 74.4 | 76.4 | 72.7 | 73.5 | 77.5 | 73.1 | 74.6 | 68.6 | 68.6 |
| bromine per ring | 3.4 | 3.7 | 4.1 | 3.4 | 3.6 | 4.4 | 3.5 | 3.7 | 2.8 | 2.8 |
| Tg (° C.) (DSC) | 112.3 | 137.2 | 163.02 | 112.6 | 142.5 | 163.1 | 117.44 | 140.35 | 150.34 | 133.79 |
| TGA (N₂) | | | | | | | | | | |
| 1% Wt. Loss (° C.) | 328 | 340 | 359 | 321 | 336 | 350 | 295 | 320 | 320 | 332 |
| 5% Wt. Loss (° C.) | 358 | 370 | 383 | 353 | 367 | 373 | 343 | 359 | 359 | 360 |
| 10% Wt. Loss (° C.) | 370 | 380 | 391 | 366 | 378 | 383 | 361 | 373 | 371 | 370 |
| 50% Wt. Loss (° C.) | 403 | 412 | 419 | 399 | 413 | 413 | 400 | 408 | 401 | 402 |
| Thermal HBr 300° C. (ppm) | 309 | 127 | 82 | 226 | <50 | 256 | 265 | 269 | 72 | <50 |
| GPC | | | | | | | | | | |
| Mw | 3740 | 3700 | 3400 | 3689 | 4093 | 4232 | 4080 | 4070 | 14000 | 7900 |
| Mn | 3100 | 2990 | 2710 | 2778 | 3104 | 3107 | 1970 | 1800 | 8100 | 3800 |
| Mz | 4810 | 4780 | 4030 | 5135 | 5737 | 6206 | 6831 | 7049 | 20642 | 12131 |
| PD | 1.2 | 1.24 | 1.25 | 1.33 | 1.32 | 1.362 | 2.07 | 2.26 | 1.74 | 2.08 |
| Color (YI Powder) | 6.27 | 6.84 | 8.48 | 5.71 | | | | | | |
| Color (solution) | | | | | | | | | | |
| L | 100.29 | 99.27 | 98.82 | 99.29 | 99.6 | N/A | 99.15 | 99.34 | 98.58 | 98.1 |
| a | −0.28 | −0.42 | −0.65 | −0.23 | −0.54 | N/A | −2.15 | −2.08 | −1.07 | −1.88 |
| b | 1.83 | 2.87 | 3.64 | 2.95 | 2.81 | N/A | 6.47 | 6.06 | 5.2 | 7.69 |
| ΔE | 1.87 | 2.99 | 3.88 | 3.04 | 2.89 | N/A | 6.87 | 6.44 | 5.50 | 8.14 |

HIPS and ABS Formulations

General Procedure for Compounding, Injection Molding and Testing of HIPS and ABS Formulated with CLASP Materials.

HIPS

The HIPS resin and the flame-retardant in addition to antimony oxide were mixed in a plastic bag using a tumble mixer for approximately 10 minutes prior to extrusion. The compounding was conducted on a Werner & Pfleiderer ZSK30 twin-screw extruder at 175 rpm. The feed rate was 8 kg/hr. The temperature profile was 175-175-190-215-215° C. In some cases, the first zone temperature was lowered to 125-150° C. in order to avoid sticking issues at feed throat. A trap was used to capture any volatiles if there was any. The extruded strand was first cooled down by passing an iced-water bath and then pelletized on-line. All formulations were injection molded at a Battenfeld BA350 CD injection-molding machine. The temperature profile was 195-195-205° C. for most of the samples. A lower feed zone temperature of 190° C. was used in some cases. The mold temperature was 40° C.

ABS

The ABS resin, flame-retardant, antimony oxide and antioxidant were mixed in a plastic bag using a tumble mixer for approximately 10 minutes prior to extrusion. The compounding was conducted on a Werner & Pfleiderer ZSK30 twin-screw extruder at 175 rpm. The feed rate was 8 kg/hr. The temperature profile was 190-210-210-220-220° C. In some cases, the first zone temperature was lowered to 125-150° C. in order to avoid sticking issues at feed throat. A trap was used to capture any volatiles if there was any. The extruded strand was first cooled down by passing an iced-water bath and then pelletized on-line. All formulations were injection molded at a Battenfeld BA350 CD injection-molding machine. The temperature profile was 204-216-221° C. The mold temperature was 40° C.

Testing was performed on HIPS and ABS samples according to the following ASTM test standards: VICAT (ASTM D649); Heat Deflection Temperature under Load (ASTM D648) ⅛" (32 mm) at 264 psi (1820 kPa); Notched-Izod Impact Strength (ASTM D256 method A); and Melt Flow Index (ASTM D1238 procedure A), 200° C./5 kg. The UL-94 flammability test was performed on ⅛" (32 mm) bars. The results are reported in Table II.

TABLE II

HIPS

| HIPS FORMULATION Bromination Example | | 1<br>1 | 2<br>2 | 3<br>3 | 4<br>4 | 5<br>5 | 6<br>7 | 7<br>8 | 8<br>10 | 9<br>11 | 10<br>12 | 11<br>13 | 12<br>14 | 13<br>15 |
|---|---|---|---|---|---|---|---|---|---|---|---|---|---|---|
| Dow 801 (HIPS) | wt. % | 81.1 | 82.2 | 82.5 | 83.2 | 83.3 | 82.3 | 82.5 | 81.9 | 82.5 | 82.6 | 81.4 | 82.0 | 82.5 |
| Brightsun HB (ATO) | wt. % | 4.0 | 4.0 | 4 | 4 | 4 | 4 | 4 | 4.0 | 4.0 | 4.0 | 4.0 | 4.0 | 4 |
| Br-FR Loading | wt. % | 14.9 | 13.8 | 13.5 | 12.8 | 12.7 | 13.7 | 13.5 | 14.1 | 13.5 | 13.4 | 14.6 | 14.0 | 13.5 |
| PROPERTIES | | | | | | | | | | | | | | |
| HDT, 264 psi | ASTM D648 °C. | 68.4 | 70.8 | 69.3 | 73.0 | 73.0 | 68.4 | 69.3 | 70.6 | 73.2 | 73.4 | 72.3 | 73.4 | 71.9 |
| Vicat | ASTM D649 °C. | | | 96.1 | 100 | 99.9 | 94.7 | 95.8 | 93.9 | 96.4 | 97.4 | 96.6 | 98 | 99.4 |
| Izod Impact | ASTM D256 ft-lb/in | 1.44 | 1.34 | 1.36 | 1.48 | 1.51 | 1.34 | 1.36 | 1.36 | 1.42 | 1.42 | 1.30 | 1.33 | 1.33 |
| UL-94, 1/8" | UL-94 rating | fail (time) | V-0 | V-0 | V-0 | V-1 | V-0 | V-0 | V-0 | V-0 | V-0 | V-0 | V-0 | V-0 |
| MFI, 200° C./5 kg | ASTM D1238 g/10 min | 17.1 | 18.2 | 14.3 | 11.3 | 10.9 | 15.2 | 14.5 | 15.53 | 13.5 | 12.61 | 14.53 | 13.28 | 11.6 |

| HIPS FORMULATION Bromination Example | | 14<br>16 | 15<br>17 | 16<br>18 | 17<br>19 | 18<br>21 | 19<br>22 | 20<br>23 | 21<br>24 | 22<br>25 | 23<br>26 | 24<br>27 | 25<br>28 | 26<br>29 | 27<br>30 |
|---|---|---|---|---|---|---|---|---|---|---|---|---|---|---|---|
| Dow 801 (HIPS) | wt. % | 82.5 | 82.0 | 82.5 | 82.6 | 82.1 | 82.5 | 82.8 | 82.0 | 82.5 | 82.8 | 82.3 | 82.6 | 81.4 | 81.4 |
| Brightsun HB (ATO) | wt. % | 4 | 4 | 4 | 4 | 4 | 4 | 4 | 4 | 4 | 4 | 4 | 4 | 4 | 4 |
| Br-FR Loading | wt. % | 13.5 | 14.0 | 13.5 | 13.4 | 13.9 | 13.5 | 13.2 | 14.0 | 13.5 | 13.2 | 13.7 | 13.4 | 14.6 | 14.6 |
| PROPERTIES | | | | | | | | | | | | | | | |
| HDT, 264 psi | ASTM D648 °C. | 73.1 | 72.2 | 72.4 | 72.9 | 72.5 | 73.5 | 74.1 | 72.9 | 73.4 | 74.5 | 73.2 | 74 | 74.8 | 73.5 |
| Vicat | ASTM D649 °C. | | 99.4 | 100.7 | 100.8 | 99.9 | 101 | 101.2 | 99.8 | 100.9 | 101.2 | | | | |
| Izod Impact | ASTM D256 ft-lb/in | 1.36 | 1.37 | 1.42 | 1.42 | 1.44 | 1.46 | 1.51 | 1.31 | 1.39 | 1.46 | 1.27 | 1.38 | 0.92 | 0.86 |
| UL-94, 1/8" | UL-94 rating | V-0 | V-0 | V-0 | V-0 | V-0 | V-0 | V-0 | V-0 | V-0 | V-0 | V-0 | Fail* | V-0 | V-0 |
| MFI, 200° C./5 kg | ASTM D1238 g/10 min | 12.7 | 12.1 | 10.3 | 10.1 | 11.5 | 10.4 | 9.1 | 11.9 | 10.1 | 9.0 | 11.3 | 10.1 | 8.8 | 11 |

ABS

| ABS FORMULATION Bromination Example | | 1<br>3 | 2<br>4 | 3<br>5 | 4<br>6 | 5<br>7 | 6<br>10 | 7<br>11 | 8<br>12 | 9<br>13 | 10<br>14 | 11<br>15 |
|---|---|---|---|---|---|---|---|---|---|---|---|---|
| Dow 342 EZ | wt. % | 79.2 | 80.0 | 80.1 | 79.4 | 78.8 | 78.3 | 79.1 | 79.4 | 77.9 | 78.5 | 79.2 |
| Brightsun HB (ATO) | wt. % | 4.5 | 4.5 | 4.5 | 4.5 | 4.5 | 4.5 | 4.5 | 4.5 | 4.5 | 4.5 | 4.5 |
| AT-181 | wt. % | 0.1 | 0.1 | 0.1 | 0.1 | 0.1 | 0.1 | 0.1 | 0.1 | 0.1 | 0.1 | 0.1 |
| Br-FR Loading | wt. % | 16.2 | 15.4 | 15.3 | 16.0 | 16.6 | 17.1 | 16.3 | 16.0 | 17.5 | 16.9 | 16.2 |
| PROPERTIES | | | | | | | | | | | | |
| HDT, 264 psi | ASTM D648 °C. | 72.4 | 73.9 | 74.2 | 72.6 | 71.2 | 71.7 | 73.5 | 74.4 | 73.9 | 74.4 | 73.4 |
| Vicat | ASTM D649 °C. | 99.8 | 103.2 | 103 | 100.4 | 98.9 | | 101.2 | 99.8 | | | 102.2 |
| Izod Impact | ASTM D256 ft-lb/in | 1.76 | 1.80 | 1.86 | 1.87 | 1.78 | 1.77 | 1.88 | 1.88 | 1.64 | 1.77 | 1.76 |
| UL-94, 1/8" | UL-94 rating | V-0 | V-0 | V-0 | V-0 | V-0 | V-0 | V-0 | V-0 | V-0 | V-0 | V-0 |
| MFI, 230° C./3.8 kg | ASTM D1238 g/10 min | 11.6 | 10.1 | 10.2 | 11.0 | 11.8 | 11.9 | 11.2 | 10.0 | 11.7 | 11.9 | 10.0 |

TABLE II-continued

| ABS FORMULATION Bromination Example | | 12 16 | 13 17 | 14 18 | 15 19 | 16 21 | 17 22 | 18 23 | 19 24 | 20 25 | 21 26 | 22 27 | 23 28 |
|---|---|---|---|---|---|---|---|---|---|---|---|---|---|
| Dow 342 EZ | wt. % | 79.4 | 78.6 | 79.2 | 79.3 | 78.7 | 79.2 | 79.6 | 78.6 | 79.2 | 79.6 | 79.0 | 79.3 |
| Brightsun HB (ATO) | wt. % | 4.5 | 4.5 | 4.5 | 4.5 | 4.5 | 4.5 | 4.5 | 4.5 | 4.5 | 4.5 | 4.5 | 4.5 |
| AT-181 | wt. % | 0.1 | 0.1 | 0.1 | 0.1 | 0.1 | 0.1 | 0.1 | 0.1 | 0.1 | 0.1 | 0.1 | 0.1 |
| Br-FR Loading | wt. % | 16.0 | 16.8 | 16.2 | 16.1 | 16.7 | 16.2 | 15.8 | 16.8 | 16.2 | 15.8 | 16.4 | 16.1 |
| PROPERTIES | | | | | | | | | | | | | |
| HDT, 264 psi | ASTM D648 °C. | 73.9 | 74 | 74.8 | 75.8 | 73.9 | 75.4 | 76.8 | 74.4 | 76 | 76.1 | 74.8 | 75.2 |
| Vicat | ASTM D649 °C. | 101.9 | 102.3 | 103.6 | 103.7 | 102.2 | 103.4 | 103.9 | 102.9 | 103.8 | 104.1 | 102.7 | 103.2 |
| Izod Impact | ASTM D256 ft-lb/in | 1.73 | 1.71 | 1.75 | 1.78 | 1.67 | 1.71 | 1.70 | 1.58 | 1.63 | 1.68 | 1.66 | 1.76 |
| UL-94, 1/8" | UL-94 rating | V-0 | V-0 | V-0 | V-0 | V-0 | V-0 | V-0 | V-0 | V-0 | V-0 | V-0 | V-0 |
| MFI, 230° C./3.8 kg | ASTM D1238 g/10 min | 10.3 | 11.3 | 10.7 | 10.0 | 11.5 | 10.3 | 10.3 | 10.6 | 10.1 | 9.1 | 10.5 | 10.2 |

*fail due to after glow

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

The invention may comprise, consist or consist essentially of the materials and/or procedures recited herein.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A flame retardant composition comprising a brominated anionic, chain transfer, vinyl aromatic polymer (ACTVAP) distribution, wherein the ACTVAP before bromination can be represented by the following formula:

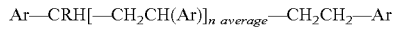

Ar—CRH[—CH$_2$CH(Ar)]$_{n\ average}$—CH$_2$CH$_2$—Ar wherein Ar is an aryl group, R is C1-C4 alkyl group or a hydrogen atom n$_{average}$ is the average number of repeating units and is based on the number average molecular weight, M$_n$, of the ACTVAP distribution, and wherein n$_{average}$ is calculated as follows:

n$_{average}$=(M$_n$ —formula wt ArCRH- formula wt ArCH$_2$CH$_2$)/(formula wt ArCH$_2$CH$_2$), wherein the composition: (i) contains above 73 wt% bromine, and (ii) contains less than about 1,000 ppm (wt/wt) thermally labile Br, as determined by the Thermally Labile Bromine Test, the wt% and ppm values being based upon the total weight of the composition, and wherein the brominated composition composition has a T$_g$ value within the range of from about 35° C. to about 165° C., and wherein optionally the composition has a Yellowness Index (ASTM 01925) of from about 1 to about 8.

2. A composition of claim 1 wherein the composition has a Yellowness Index (ASTM D1925) of from about 1 to about 8.

3. A composition of claim 1 wherein said T$_g$ value is within the range of from about 75° C. to about 135° C.

4. A composition of claim 1 wherein said composition contains from about 74 to 79 wt % bromine.

5. A composition of claim 1 wherein the composition contains about 500 ppm (wt/wt) or less of thermally labile Br as determined by the Thermally Labile Bromine Test.

6. A composition of claim 1 wherein the composition has a TGA wt % loss of 5%, under nitrogen, at a temperature of from about 290° C. to about 380° C.

7. A composition of claim 1 wherein the brominated ACTVAP distribution is a brominated anionic, chain transfer, styrene polymer (ACTSP) distribution.

8. A composition of claim 7 wherein the brominated composition has a T$_g$ value within the range of from about 35° C. to about 165° C.

9. A composition of claim 7 wherein the brominated composition has a T$_g$ value within the range of from about 75° C. to about 135° C.

10. A composition of claim 7 wherein said composition contains from about 74 to 79 wt % bromine.

11. A composition of claim 7 wherein the composition contains about 500 ppm (wt/wt) thermally labile Br, as determined by the Thermally Labile Bromine Test based on the total weight of the composition.

12. A composition of claim 7 wherein the composition has a TGA wt % loss of 5%, under nitrogen, at a temperature of from about 290° C. to about 380° C.

13. A composition of claim 7 wherein the composition has a Yellowness Index (ASTM D1925) of from about 1 to about 8.

14. A HIPS-based or ABS-based formulation with which has been blended a flame retardant amount of a composition of claim 1.

15. A HIPS-based or ABS-based formulation with which has been blended a flame retardant amount of a composition of claim 7.

16. A thermoplastic article in which has been included a composition of claim 1.

17. A thermoplastic article in which has been included a composition of claim 7.

* * * * *

UNITED STATES PATENT AND TRADEMARK OFFICE
CERTIFICATE OF CORRECTION

PATENT NO.       : 9,914,830 B2
APPLICATION NO.  : 14/633591
DATED            : March 13, 2018
INVENTOR(S)      : William J. Layman, Jr. et al.

It is certified that error appears in the above-identified patent and that said Letters Patent is hereby corrected as shown below:

Claim 1, Line 6, the second occurrence of "composition" should be deleted.

Signed and Sealed this
Twenty-ninth Day of May, 2018

Andrei Iancu
*Director of the United States Patent and Trademark Office*